US 11,401,968 B2

(12) United States Patent
Cope et al.

(10) Patent No.: US 11,401,968 B2
(45) Date of Patent: Aug. 2, 2022

(54) SNAP-IN BEARING CUP

(71) Applicant: DANA AUTOMOTIVE SYSTEMS GROUP, LLC, Maumee, OH (US)

(72) Inventors: Edward J. Cope, Perrysburg, OH (US); Michael J. Horvath, Waterville, OH (US); Bao T. Luong, Lambertville, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 472 days.

(21) Appl. No.: 16/480,009

(22) PCT Filed: Jan. 23, 2018

(86) PCT No.: PCT/US2018/014809
§ 371 (c)(1),
(2) Date: Jul. 23, 2019

(87) PCT Pub. No.: WO2018/136923
PCT Pub. Date: Jul. 26, 2018

(65) Prior Publication Data
US 2019/0383326 A1    Dec. 19, 2019

Related U.S. Application Data

(60) Provisional application No. 62/449,342, filed on Jan. 23, 2017.

(51) Int. Cl.
*F16C 21/00* (2006.01)
*F16D 3/38* (2006.01)

(52) U.S. Cl.
CPC ............ *F16C 21/005* (2013.01); *F16D 3/385* (2013.01)

(58) Field of Classification Search
CPC ................................ F16C 21/005; F16D 3/385
(Continued)

(56) References Cited

U.S. PATENT DOCUMENTS 768,200 A     8/1904  Speirs
3,545,232 A * 12/1970 Gerhard ................ F16C 19/547
                                                     464/128
(Continued)

FOREIGN PATENT DOCUMENTS

EP        1719928        11/2006
FR        2968050         6/2012
WO      2017215950       12/2017

OTHER PUBLICATIONS

European Patent Office, International Search Report with Written Opinion issued in PCT/US2018/014809 dated May 14, 2018, 11 pages, European Patent Office, Rijswijk, Netherlands.

*Primary Examiner* — Greg Binda
(74) *Attorney, Agent, or Firm* — Marshall & Melhorn, LLC

(57) ABSTRACT

A joint assembly having a first joint member drivingly connected to a second joint member by a third joint member. The first joint member of the joint assembly has a first yoke arm with a first yoke arm aperture defined by a first yoke arm aperture surface and a second yoke arm with a second yoke arm aperture defined by a second yoke arm aperture surface. The joint assembly M further includes one or more bearing cup assemblies having a bearing cup with a base portion and a tubular portion. At least a portion of the bearing cup assemblies are received and/or retained within at least a portion of the first yoke arm aperture and the second yoke arm aperture of the first joint member. One or more attachment portions extend outboard from at least a portion of an outer surface of the base portion of the bearing cup.

15 Claims, 10 Drawing Sheets

(58) Field of Classification Search
USPC ................................. 464/128, 130; 384/539
See application file for complete search history.

(56) References Cited

U.S. PATENT DOCUMENTS

| | | | |
|---|---|---|---|
| 3,784,268 A | | 1/1974 | De Gioia |
| 4,606,657 A | * | 8/1986 | Tanaka ................. F16C 13/006 |
| | | | 384/539 |
| 5,267,901 A | | 12/1993 | Jost |
| 6,162,126 A | | 12/2000 | Barrett |
| 6,319,131 B1 | | 11/2001 | Lindenthal |
| 7,179,172 B2 | | 2/2007 | Nelson |
| 7,189,162 B2 | | 3/2007 | Menosky |
| 7,201,663 B2 | | 4/2007 | Menosky |
| 8,308,577 B2 | | 11/2012 | Braun |
| 2005/0159224 A1 | | 7/2005 | Nelson |

* cited by examiner

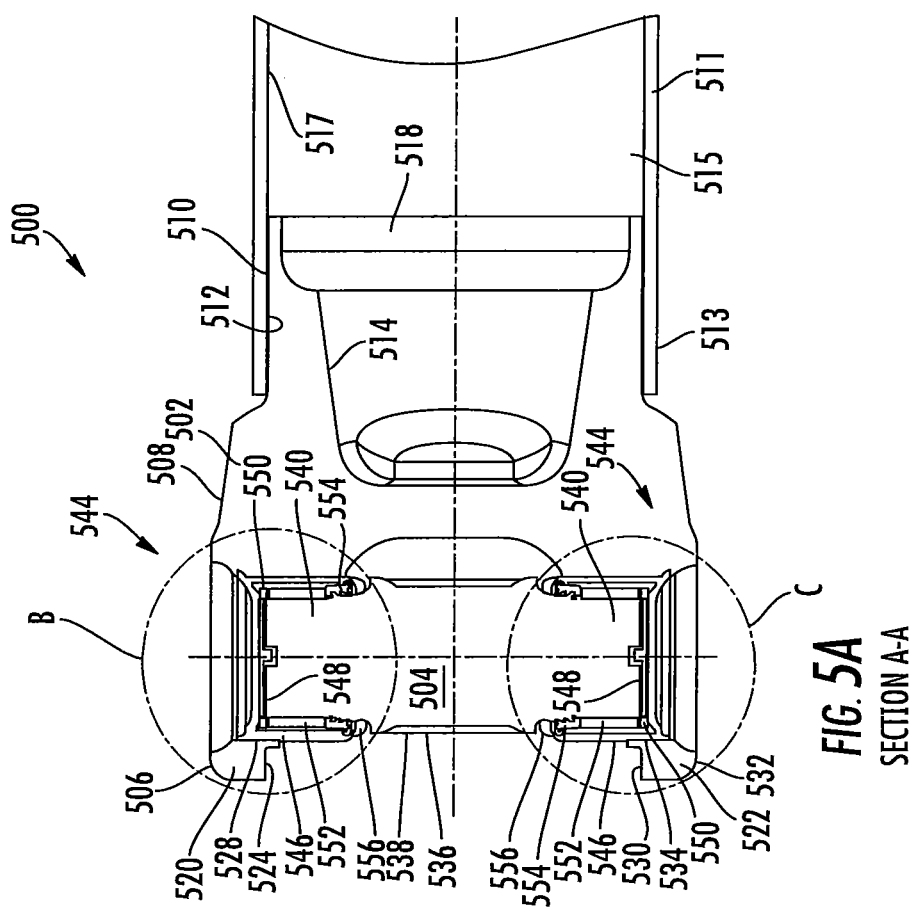
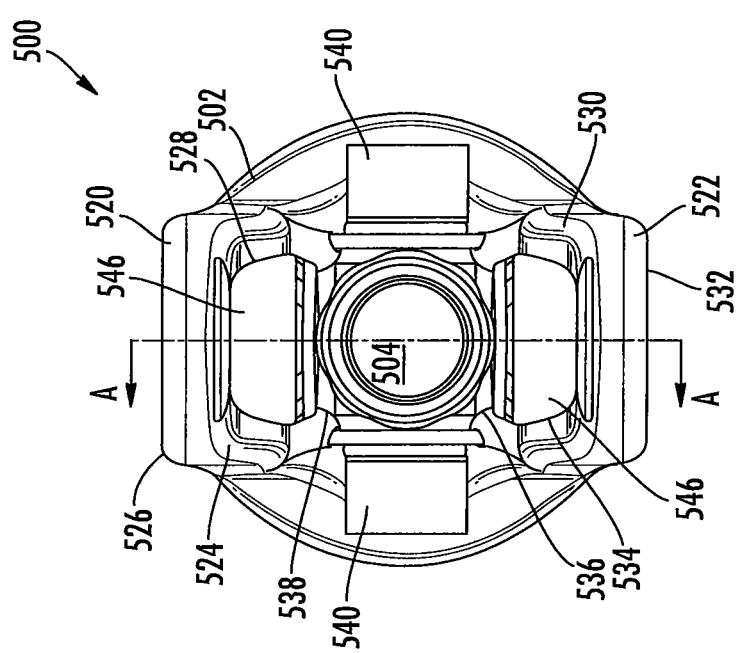

DETAIL B

DETAIL C

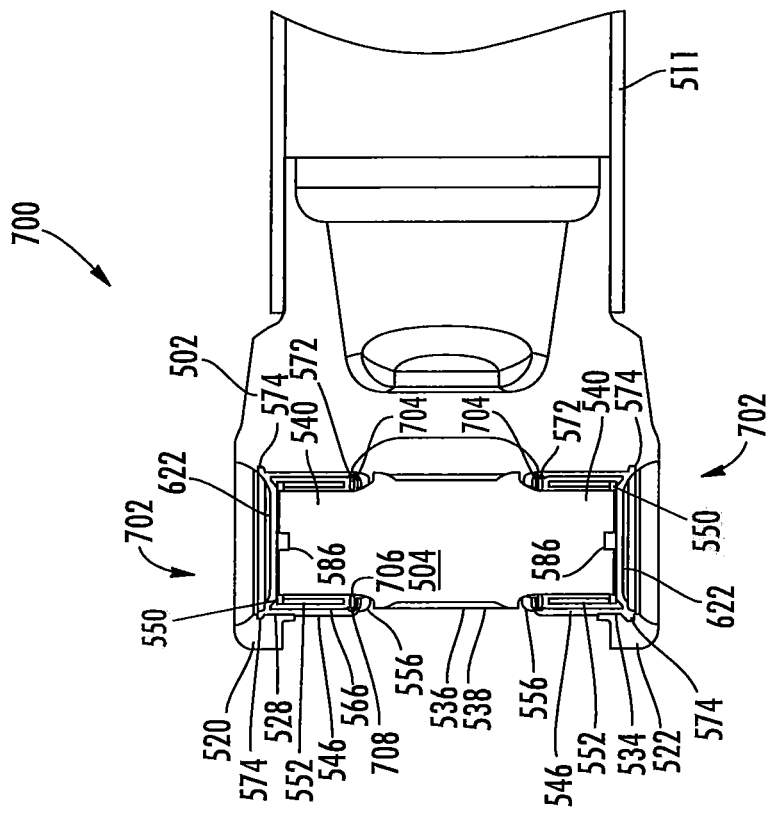
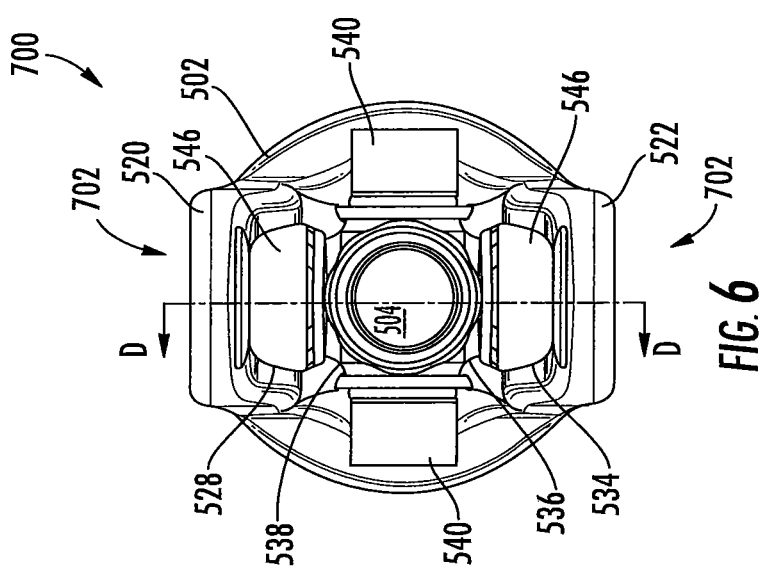

SNAP-IN BEARING CUP

CROSS REFERENCE TO RELATED APPLICATIONS

The present application is the National Stage of International Application No. PCT/US2018/014809, filed Jan. 23, 2019, which claims the benefit of U.S. Provisional Patent Application No. 62/449,342, filed on Jan. 23, 2017, which is incorporated herein by reference in its entirety to the extent allowed by law.

FIELD OF THE DISCLOSURE

The present disclosure relates to a snap-in bearing cup for use in a joint assembly.

BACKGROUND OF THE DISCLOSURE

Universal joint assemblies incorporate the use of a bearing cup to rotationally and drivingly connect one or more trunnions of a journal cross to an end yoke of the universal joint assembly. Conventional bearing cups known in the art incorporate the use of one or more snap-rings to retain the bearing cup on the one or more trunnions of the journal cross. In order to compensate for variations in part dimensions, snap-rings of varying dimensions are required to retain the bearing cup on the one or more trunnions of the journal cross. This adds an undesirable amount of time and complexity to the assembly process for the bearing cup, which increases the overall cost of the universal joint assembly. It would therefore be advantageous to develop a bearing cup that does not require the use the one or more snap-rings to retain the bearing cup on the one or more trunnions of the journal cross. Additionally, it would be advantageous to develop a bearing cup that is quick and easy to install and will reduce the overall cost associated with the manufacture and assembly of the universal joint assembly.

SUMMARY OF THE DISCLOSURE

A joint assembly having a first joint member, a second joint member and a third joint member. At least a portion of the first joint member is drivingly connected to at least a portion of the second joint member via the third joint member. The first joint member has a first yoke arm with a first yoke arm aperture defined by a first yoke arm aperture surface and a second yoke arm with a second yoke arm aperture defined by a second yoke arm aperture surface. The joint assembly further includes one or more bearing cup assemblies having a bearing cup. The bearing cup of the joint assembly includes a base portion and a tubular portion. Extending outboard from at least a portion of an outer surface of the base portion of the bearing cup is one or more attachment portions.

According to an aspect of the disclosure, the first yoke arm of the joint assembly may further include one or more first yoke arm attachment grooves and the second yoke arm may further include one or more second yoke arm attachment grooves. The one or more first yoke arm attachment grooves circumferentially extend along at least a portion of the first yoke arm aperture surface defining the first yoke arm aperture. Additionally, the one or more second yoke arm attachment grooves circumferentially extend along at least a portion of the second yoke arm aperture surface defining the second yoke arm aperture. The one or more first and second yoke arm attachment grooves have a size and shape to receive and/or retain at least a portion of the one or more attachment portions of the base portion of the bearing cup.

According to an aspect of the disclosure, the first yoke arm aperture may further include one or more first yoke arm lead-in portions. At least a portion of the one or more first lead-in portions are disposed outboard from at least a portion of the one or more first yoke arm attachment grooves. The one or more first yoke arm lead-in portions have a first end with a diameter D1 that is larger than a diameter D2 of a second end of the one or more first yoke arm lead-in portions.

According to an aspect of the disclosure, the one or more first yoke arm lead-in portions of the first yoke arm aperture elastically deform the one or more attachment portions of the bearing cup inboard. Once the one or more attachment portions have translated beyond the one or more first yoke arm lead-in portions, the one or more attachment portions translate outboard and into the one or more first yoke arm attachment grooves in the first yoke arm aperture.

According an aspect of the disclosure, the second yoke arm aperture may further include one or more second yoke arm lead-in portions. At least a portion of the one or more second lead-in portions are disposed outboard from at least a portion of the one or more second yoke arm attachment grooves. The one or more second yoke arm lead-in portions have a first end with a diameter D1 that is larger than a diameter D2 of a second end of the one or more second yoke arm lead-in portions.

According to an aspect of the disclosure, the one or more second yoke arm lead-in portions of the second yoke arm aperture elastically deform the one or more attachment portions of the bearing cup inboard. Once the one or more attachment portions have translated beyond the one or more second yoke arm lead-in portions, the one or more attachment portions translate outboard and into the one or more second yoke arm attachment grooves in the second yoke arm aperture.

According to an aspect of the disclosure, the base portion of the bearing cup may further include a recessed portion. The recessed portion of the bearing cup extends inward from at least a portion of an outboard surface of the base portion of the bearing cup.

According to an aspect of the disclosure, the base portion of the bearing cup may be integrally formed as part of the tubular portion of the bearing cup of the one or more bearing cup assemblies.

According to an aspect of the disclosure, the base portion of the bearing cup may be a separate component from the tubular portion of the bearing cup of the one or more bearing cup assemblies. At least a portion of the base portion of the bearing cup is disposed outboard from at least a portion of the tubular portion of the bearing cup.

According to an aspect of the disclosure, the one or more bearing cup assemblies may further include the use of one or more sealing members having a first end portion, a second end portion, an inboard surface and an outboard surface. One or more sealing lips circumferentially extend inboard from at least a portion of the inboard surface of the one or more sealing members. At least a portion of the one or more sealing lips of the one or more sealing members are sealingly engaged with at least a portion of one of one or more trunnions of the third joint member. An increased diameter portion circumferentially extends outboard from at least a portion of the outboard surface of the one or more sealing members. At least a portion of the outboard surface and/or the increased diameter portion of the one or more sealing members is sealingly engaged with at least a portion of an inner surface of the tubular portion of the bearing cup.

According to an aspect of the disclosure, the tubular portion of the bearing cup may further include a sealing member groove. The tubular portion has a first end portion and a second end portion. The sealing member groove circumferentially extending along at least a portion of the inner surface of the second end portion of the tubular portion of the bearing cup. At least a portion of the increased diameter portion of the one or more sealing members is received and/or retained within at least a portion of the sealing member groove in the inner surface of the tubular portion of the bearing cup.

According to an aspect of the disclosure, the one or more bearing cup assemblies may further include the use of a slinger having a protruding portion circumferentially extending from at least a portion a top portion of the slinger. The protruding portion of the slinger extend toward the tubular portion of the bearing cup o the one or more bearing cup assemblies. At least a portion of the protruding portion of the slinger is received and/or retained within at least a portion of a slinger groove circumferentially extending along at least a portion of an outer surface of the second end portion of the tubular portion of the bearing cup.

According to an aspect of the disclosure, the joint assembly is a universal joint assembly.

According to an aspect of the disclosure, the third joint member is a journal cross.

According to an aspect of the disclosure, the first joint member is an end yoke.

The present disclosure also relates to a bearing cup having a base portion and a tubular portion. The tubular portion of the bearing cup has a first end portion, a second end portion and an inner surface. A sealing member groove circumferentially extends along at least a portion of the inner surface of the second end portion of the tubular portion of the bearing cup. Extending outboard from at least a portion of an outer surface of the base portion of the bearing cup is one or more attachment portions. At least a portion of the base portion of the tubular portion is disposed outboard from the tubular portion of the bearing cup.

According to an aspect of the disclosure, the base portion of the bearing cup may further include a recessed portion. The recessed portion of the base portion of the bearing cup extends inward from at least a portion of an outboard surface of the base portion of the bearing cup.

According to an aspect of the disclosure, the base portion of the bearing cup is a separate component from the tubular portion of the bearing cup.

According to an aspect of the disclosure, at least a portion of an inboard surface of the base portion of the bearing cup is integrally connected to at least a portion of the first end portion of the tubular portion of the bearing cup. At least a portion of the base portion of the bearing cup may be integrally connected to at least a portion of the tubular portion of the bearing cup by using one or more welds, one or more mechanical fasteners, one or more adhesives and/or a threaded connection.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 5 is a schematic front-view of a portion of a joint assembly according to an embodiment of the disclosure;

FIG. 5A is a schematic cross-sectional side-view along the line A-A of the joint assembly illustrated in FIG. 5 according to an embodiment of the disclosure;

FIG. 6 is a schematic front-view of a portion of the joint assembly illustrated in FIGS. 5-5F according to an alternative embodiment of the disclosure;

FIG. 6A is a schematic cross-sectional side-view along the line D-D of the joint assembly illustrated in FIG. 6 according to an embodiment of the disclosure;

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the bearing cup disclosed herein may be used in automotive, off-road vehicle, all-terrain vehicle, construction, structural, marine, aerospace, locomotive, military, machinery, robotic and/or consumer product applications. Additionally, as a non-limiting example, the bearing cup disclosed herein may also be used in passenger vehicle, electric vehicle, hybrid vehicle, commercial vehicle, autonomous vehicles, semi-autonomous vehicles and/or heavy vehicle applications.

Figure 1:
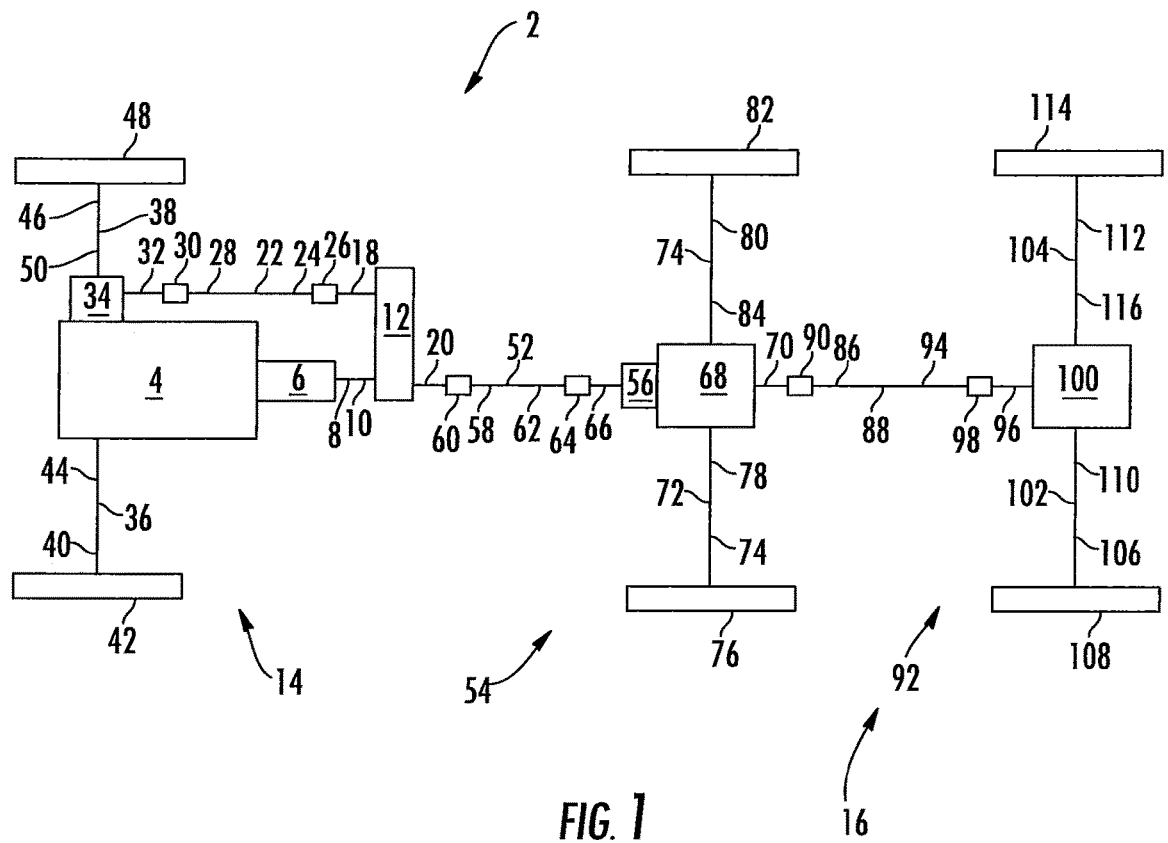
FIG. 1 is a schematic top-plan view of a vehicle having one or more coupling assemblies according to an embodiment of the disclosure.

FIG. 1 is a schematic top-plan view of a vehicle 2 having one or more constant velocity joint assemblies according to an embodiment of the disclosure. The vehicle 2 has an engine 4 which is drivingly connected to a transmission 6. A transmission output shaft 8 is drivingly connected to an end of the transmission 6 opposite the engine 4. The transmission 6 is a power management system which provides controlled application of the rotational power generated by the engine by means of a gear box.

The transmission output shaft 8 is drivingly connected to a transfer case input shaft 10 which in turn is drivingly connected to a transfer case 12. The transfer case 12 is used to transfer the rotational power from the transmission 6 to a front axle system 14 and a tandem axle system 16 by utilizing a series of gears and drive shafts. The transfer case 12 includes a first transfer case output 18 shaft and a second transfer case output shaft 20.

A first drive shaft 22 extends from the first transfer case output shaft 18 to the forward axle system 14 of the vehicle 2. A first end 24 of the first drive shaft 22 is drivingly connected to an end of the first transfer case output shaft 18 opposite the transfer case 12 via a joint assembly 26 according to an embodiment of the disclosure. As a non-limiting example, the joint assembly 26 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly. A second end 28 of the first drive shaft 22 is drivingly connected to a second joint assembly 30 according to an embodiment of the disclosure. As a non-limiting example, the second joint assembly 30 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Drivingly connected to an end of the second joint assembly 30 is an end of a forward axle system input shaft 32. As a non-limiting example, the forward axle system input shaft 32 is a forward axle differential input shaft, a coupling shaft, stub shaft or a forward axle differential pinion shaft. Drivingly connected to an end of the forward axle system input shaft 32 opposite the first drive shaft 22 is a forward axle differential 34. The forward axle differential 34 is a set of gears that allows the outer drive wheel(s) of the wheeled vehicle to rotate at a faster rate that the inner drive wheel(s). The rotational power is transmitted through the forward axle system 14 as described in more detail below.

The forward axle system 14 further includes a first forward axle half shaft 36 and a second forward axle half shaft 38. The first forward axle half shaft 36 extends substantially perpendicular to the forward axle system input shaft 32. A first end 40 of the first forward axle half shaft 36 is drivingly connected to a first forward axle wheel assembly 42 and a second end 44 of the first forward axle half shaft 36 is drivingly connected to an end of the forward axle differential 34. As a non-limiting example, the second end 44 of the first forward axle half shaft 36 is drivingly connected to a forward axle differential side gear, a separate stub shaft, a separate coupling shaft, a first forward axle differential output shaft and/or a shaft that is formed as part of a forward axle differential side gear.

The second forward axle half shaft 38 extends substantially perpendicular to the forward axle system input shaft 32. A first end 46 of the second forward axle half shaft 38 is drivingly connected to a second forward axle wheel assembly 48 and a second end 50 of the second forward axle half shaft is drivingly connected to an end of the forward axle differential 34 opposite the first forward axle half shaft 36. As a non-limiting example, the second end of the second forward axle half shaft is drivingly connected to a forward axle differential side gear, a separate stub shaft, a separate coupling shaft, a second forward axle differential output shaft and/or a shaft that is formed as part of a forward axle differential side gear.

An end of the second transfer case output shaft 20 is drivingly connected to an end of the transfer case 12 opposite the transfer case input shaft 10. A second drive shaft 52 extends from the second transfer case output shaft 20 and drivingly connects the transfer case 12 to a forward tandem axle system 54 having an inter-axle differential 56. As illustrated in FIG. 1 of the disclosure, a first end 58 of the second drive shaft 52 is drivingly connected to an end of the second transfer case output shaft 20 opposite the transfer case 12 via a joint assembly 60 according to an embodiment of the disclosure. As non-limiting example, the joint assembly 56 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

A second end 62 of the second drive shaft 52 is drivingly connected to a second joint assembly 64 according to an embodiment of the disclosure. As a non-limiting example, the second joint assembly 64 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Drivingly connected to an end of the second joint assembly 64 is an end of a forward tandem axle system input shaft 66. As a non-limiting example, the forward tandem axle system input shaft 66 is an inter-axle differential input shaft, a coupling shaft, stub shaft or an inter-axle differential pinion shaft. The inter-axle differential 56 is a device that divides the rotational power generated by the engine between the axles in a vehicle 2. The rotational power is transmitted through the forward tandem axle system 54 as described in more detail below.

As illustrated in FIG. 1 of the disclosure, the inter-axle differential 56 is drivingly connected to a forward tandem axle differential 68 and a forward tandem axle system output shaft 70. The forward tandem axle differential 68 is a set of gears that allows the outer drive wheel(s) of a wheeled vehicle to rotate at a faster rate than the inner drive wheel(s).

The forward tandem axle system 54 further includes a first forward tandem axle half shaft 72 and a second forward tandem axle half shaft 74. The first forward tandem axle half shaft 72 extends substantially perpendicular to the second drive shaft 52. A first end 74 of the first forward tandem axle half shaft 72 is drivingly connected to a first forward tandem axle wheel assembly 76 and a second end 78 of the first forward tandem axle half shaft 72 is drivingly connected to an end of the forward tandem axle differential 68. As a non-limiting example, the second end 78 of the first forward tandem axle half shaft 72 is drivingly connected to a forward tandem axle differential side gear, a separate stub shaft, a separate coupling shaft, a first forward tandem axle differential output shaft and/or a shaft that is formed as part of a forward tandem axle differential side gear.

Extending substantially perpendicular to the second drive shaft 52 is the second forward tandem axle half shaft 74. A first end 80 of the second forward tandem axle half shaft 74 is drivingly connected to a second forward tandem axle wheel assembly 82 and a second end 84 of the second forward tandem axle half shaft 74 is drivingly connected to an end of the forward tandem axle differential 68 opposite the first forward tandem axle half shaft 72. As a non-limiting example, the second end 84 of the second forward tandem axle half shaft 74 is drivingly connected to a forward tandem axle differential side gear, a separate stub shaft, a separate coupling shaft, a second forward tandem axle differential output shaft and/or a shaft that is formed as part of a forward tandem axle differential side gear.

One end of the forward tandem axle system output shaft 70 is drivingly connected to a side of the inter-axle differential 56 opposite the second drive shaft 52. An end of the forward tandem axle system output shaft 70 opposite the inter-axle differential 56 is drivingly connected to a first end 86 of a third drive shaft 88 via a joint assembly 90 according to an embodiment of the disclosure. As a non-limiting example, the joint assembly 90 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly. The third drive shaft 88 drivingly connects the forward tandem axle system 54 to a rear tandem axle system 92 of the vehicle 2.

A second end 94 of the third drive shaft 88 is drivingly connected to an end of a rear tandem axle system input shaft 96 via a second joint assembly 98 according to an embodiment of the disclosure. As a non-limiting example, the second joint assembly 98 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Drivingly connected to an end of the second joint assembly 98 is an end of the rear tandem axle system input shaft 96. As a non-limiting example, the rear tandem axle input shaft 96 is a rear tandem axle differential input shaft, a coupling shaft, stub shaft or a rear tandem axle differential pinion shaft. Drivingly connected to an end of the rear tandem axle input shaft 96 opposite the third drive shaft 88 is a rear tandem axle differential 100. The rear tandem axle differential 100 is a set of gears that allows the outer drive wheel(s) of the wheeled vehicle to rotate at a faster rate that the inner drive wheel(s). The rotational power is transmitted through the rear tandem axle system 92 as described in more detail below.

The rear tandem axle system 92 further includes a first rear tandem axle half shaft 102 and a second rear tandem axle half shaft 104. The first rear tandem axle half shaft 102 extends substantially perpendicular to the rear tandem axle input shaft 96. A first end 106 of the first rear tandem axle half shaft 102 is drivingly connected to a first rear tandem axle wheel assembly 108 and a second end 110 of the first rear tandem axle half shaft 102 is drivingly connected to an end of the rear tandem axle differential 100. As a non-limiting example, the second end 110 of the first rear tandem axle half shaft 102 is drivingly connected to a rear tandem axle differential side gear, a separate stub shaft, a separate coupling shaft, a first rear tandem axle differential output shaft and/or a shaft that is formed as part of a rear tandem axle differential side gear.

The second rear tandem axle half shaft 104 extends substantially perpendicular to the rear tandem axle system input shaft 96. A first end 112 of the second rear tandem axle half shaft 104 is drivingly connected to a second rear tandem axle wheel assembly 114 and a second end 116 of the second rear tandem axle half shaft 104 is drivingly connected to an end of the rear tandem axle differential 100 opposite the first rear tandem axle half shaft 102. As a non-limiting example, the second end 116 of the second rear tandem axle half shaft 104 is drivingly connected to a rear tandem axle differential side gear, a separate stub shaft, a separate coupling shaft, a second rear tandem axle differential output shaft and/or a shaft that is formed as part of a rear tandem axle differential side gear.

Figure 2:
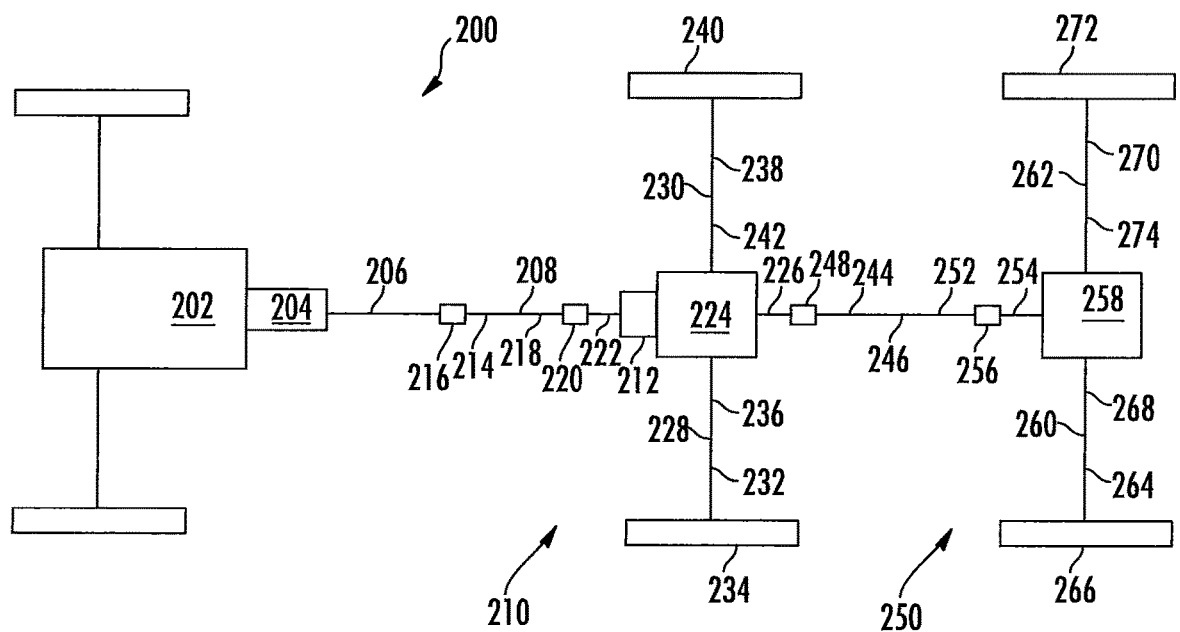
FIG. 2 is a schematic top-plan view of another vehicle having one or more coupling assemblies according to an embodiment of the disclosure.

FIG. 2 is a schematic top-plan view of another vehicle 200 having one or more coupling assemblies according to an embodiment of the disclosure. The vehicle 200 has an engine 202 which is drivingly connected to a transmission 204. A transmission output shaft 206 is drivingly connected to an end of the transmission 204 opposite the engine 202. The transmission 204 is a power management system which provides controlled application of the rotational power generated by the engine by means of a gear box.

A first drive shaft 208 extends from the transmission output shaft 206 and drivingly connects the transmission 204 to a forward tandem axle system 210 having an inter-axle differential 212. As illustrated in FIG. 2 of the disclosure, a first end 214 of the first drive shaft 208 is drivingly connected to an end of the transmission output shaft 206 opposite the transmission 204 via a joint assembly 216 according to an embodiment of the disclosure. As non-limiting example, the joint assembly 216 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

A second end 218 of the first drive shaft 208 is drivingly connected to a second joint assembly 220 according to an embodiment of the disclosure. As a non-limiting example, the second joint assembly 220 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Drivingly connected to an end of the second joint assembly 220 is an end of a forward tandem axle system input shaft 222. As a non-limiting example, the forward tandem axle system input shaft 222 is an inter-axle differential input shaft, a coupling shaft, stub shaft or an inter-axle differential pinion shaft. The inter-axle differential 212 is a device that divides the rotational power generated by the engine between the axles in a vehicle 200. The rotational power is transmitted through the forward tandem axle system 210 as described in more detail below.

As illustrated in FIG. 2 of the disclosure, the inter-axle differential 212 is drivingly connected to a forward tandem axle differential 224 and a forward tandem axle system output shaft 226. The forward tandem axle differential 224 is a set of gears that allows the outer drive wheel(s) of a wheeled vehicle to rotate at a faster rate than the inner drive wheel(s).

The forward tandem axle system 210 further includes a first forward tandem axle half shaft 228 and a second forward tandem axle half shaft 230. The first forward tandem axle half shaft 228 extends substantially perpendicular to the first drive shaft 208. A first end 232 of the first forward tandem axle half shaft 228 is drivingly connected to a first forward tandem axle wheel assembly 234 and a second end 236 of the first forward tandem axle half shaft 228 is drivingly connected to an end of the forward tandem axle differential 224. As a non-limiting example, the second end 236 of the first forward tandem axle half shaft 228 is drivingly connected to a forward tandem axle differential side gear, a separate stub shaft, a separate coupling shaft, a first forward tandem axle differential output shaft and/or a shaft that is formed as part of a forward tandem axle differential side gear.

Extending substantially perpendicular to the first drive shaft 208 is the second forward tandem axle half shaft 230. A first end 238 of the second forward tandem axle half shaft 230 is drivingly connected to a second forward tandem axle wheel assembly 240 and a second end 242 of the second forward tandem axle half shaft 230 is drivingly connected to an end of the forward tandem axle differential 224 opposite the first forward tandem axle half shaft 228. As a non-limiting example, the second end 242 of the second forward tandem axle half shaft 230 is drivingly connected to a forward tandem axle differential side gear, a separate stub shaft, a separate coupling shaft, a second forward tandem axle differential output shaft and/or a shaft that is formed as part of a forward tandem axle differential side gear.

One end of the forward tandem axle system output shaft 226 is drivingly connected to a side of the inter-axle differential 212 opposite the first drive shaft 208. An end of the forward tandem axle system output shaft 226 opposite the inter-axle differential 212 is drivingly connected to a first end 244 of a second drive shaft 246 via a joint assembly 248 according to an embodiment of the disclosure. As a non-limiting example, the joint assembly 248 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly. The second drive shaft 246 drivingly connects the forward tandem axle system 210 to a rear tandem axle system 250 of the vehicle 200.

A second end 252 of the second drive shaft 246 is drivingly connected to an end of a rear tandem axle system input shaft 254 via a second joint assembly 256 according to an embodiment of the disclosure. As a non-limiting example, the second joint assembly 256 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Drivingly connected to an end of the second joint assembly 256 is an end of the rear tandem axle system input shaft 254. As a non-limiting example, the rear tandem axle input shaft 256 is a rear tandem axle differential input shaft, a coupling shaft, stub shaft or a rear tandem axle differential pinion shaft. Drivingly connected to an end of the rear tandem axle input shaft 256 opposite the second drive shaft 246 is a rear tandem axle differential 258. The rear tandem axle differential 258 is a set of gears that allows the outer drive wheel(s) of the wheeled vehicle to rotate at a faster rate that the inner drive wheel(s). The rotational power is transmitted through the rear tandem axle system 250 as described in more detail below.

The rear tandem axle system 250 further includes a first rear tandem axle half shaft 260 and a second rear tandem axle half shaft 262. The first rear tandem axle half shaft 260 extends substantially perpendicular to the rear tandem axle input shaft 254. A first end 264 of the first rear tandem axle half shaft 260 is drivingly connected to a first rear tandem axle wheel assembly 266 and a second end 268 of the first rear tandem axle half shaft 260 is drivingly connected to an end of the rear tandem axle differential 258. As a non-limiting example, the second end 268 of the first rear tandem axle half shaft 260 is drivingly connected to a rear tandem axle differential side gear, a separate stub shaft, a separate coupling shaft, a first rear tandem axle differential output shaft and/or a shaft that is formed as part of a rear tandem axle differential side gear.

The second rear tandem axle half shaft 262 extends substantially perpendicular to the rear tandem axle system input shaft 254. A first end 270 of the second rear tandem axle half shaft 262 is drivingly connected to a second rear tandem axle wheel assembly 272 and a second end 274 of the second rear tandem axle half shaft 262 is drivingly connected to an end of the rear tandem axle differential 258 opposite the first rear tandem axle half shaft 260. As a non-limiting example, the second end 274 of the second rear tandem axle half shaft 262 is drivingly connected to a rear tandem axle differential side gear, a separate stub shaft, a separate coupling shaft, a second rear tandem axle differential output shaft and/or a shaft that is formed as part of a rear tandem axle differential side gear.

Figure 3:
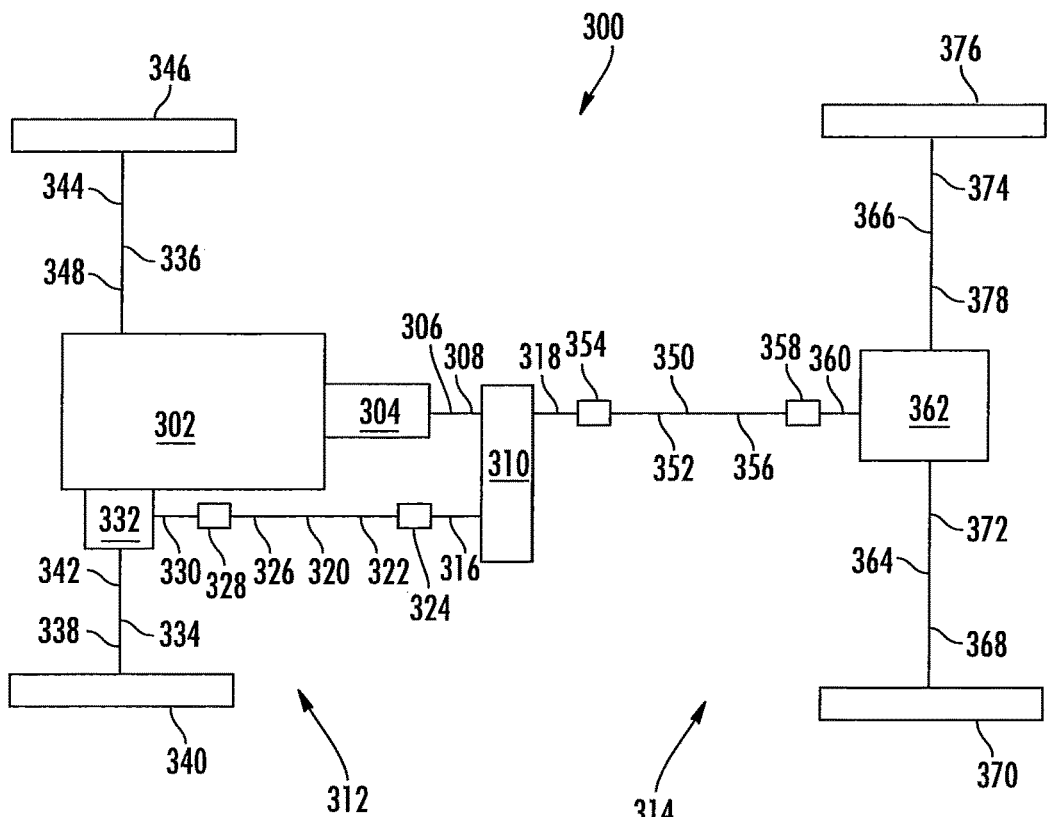
FIG. 3 is a schematic top-plan view of yet another vehicle having one or more coupling assemblies according to an embodiment of the disclosure.

FIG. 3 is a schematic top-plan view of yet another vehicle 300 having one or more coupling assemblies according to an embodiment of the disclosure. The vehicle 300 has an engine 302 which is drivingly connected to a transmission 304. A transmission output shaft 306 is then drivingly connected to an end of the transmission 304 opposite the engine 302. As previously discussed, the transmission 302 is a power management system which provides controlled application of the rotational energy generated by the engine 302 by means of a gearbox.

The transmission output shaft 306 is drivingly connected to a transfer case input shaft 308 which in turn is drivingly connected to a transfer case 310. The transfer case is used in four-wheel drive and/or all-wheel-drive (AWD) vehicles to transfer the rotational power from the transmission 304 to a front axle system 312 and a rear axle system 314 by utilizing a series of gears and drive shafts. The transfer case 310 additionally allows the vehicle to selectively operate in either a two-wheel drive mode of a four-wheel/AWD mode. The transfer case 310 includes a first transfer case output shaft 316 and a second transfer case output shaft 318.

A first drive shaft 320 extends from the first transfer case output shaft 316 to the forward axle system 312 of the vehicle 300. A first end 322 of the first drive shaft 320 is drivingly connected to an end of the first transfer case output shaft 316 opposite the transfer case 310 via a joint assembly 324 according to an embodiment of the disclosure. As a non-limiting example, the joint assembly 324 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly. A second end 326 of the first drive shaft 320 is drivingly connected to a second joint assembly 328 according to an embodiment of the disclosure. As a non-limiting example, the second joint assembly 328 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Drivingly connected to an end of the second joint assembly 328 is an end of a forward axle system input shaft 330. As a non-limiting example, the forward axle system input shaft 330 is a forward axle differential input shaft, a coupling shaft, stub shaft or a forward axle differential pinion shaft. Drivingly connected to an end of the forward axle system input shaft 330 opposite the first drive shaft 320 is a forward axle differential 332. The forward axle differential 332 is a set of gears that allows the outer drive wheel(s) of the wheeled vehicle 300 to rotate at a faster rate that the inner drive wheel(s). The rotational power is transmitted through the forward axle system 312 as described in more detail below.

The forward axle system 312 further includes a first forward axle half shaft 334 and a second forward axle half shaft 336. The first forward axle half shaft 334 extends substantially perpendicular to the forward axle system input shaft 330. A first end 338 of the first forward axle half shaft 334 is drivingly connected to a first forward axle wheel assembly 340 and a second end 342 of the first forward axle half shaft 334 is drivingly connected to an end of the forward axle differential 332. As a non-limiting example, the second end 342 of the first forward axle half shaft 334 is drivingly connected to a forward axle differential side gear, a separate stub shaft, a separate coupling shaft, a first forward axle differential output shaft and/or a shaft that is formed as part of a forward axle differential side gear.

The second forward axle half shaft 336 extends substantially perpendicular to the forward axle system input shaft 330. A first end 344 of the second forward axle half shaft 336 is drivingly connected to a second forward axle wheel assembly 346 and a second end 348 of the second forward axle half shaft 336 is drivingly connected to an end of the forward axle differential 332 opposite the first forward axle half shaft 334. As a non-limiting example, the second end 348 of the second forward axle half shaft 348 is drivingly connected to a forward axle differential side gear, a separate stub shaft, a separate coupling shaft, a second forward axle differential output shaft and/or a shaft that is formed as part of a forward axle differential side gear.

An end of the second transfer case output shaft 318 is drivingly connected to an end of the transfer case 310 opposite the transfer case input shaft 308. A second drive shaft 350 extends from the second transfer case output shaft 318 to the rear axle system 314 of the vehicle 300. A first end 352 of the second drive shaft 350 is drivingly connected to an end of the second transfer case output shaft 318 opposite the transfer case 310 via a joint assembly 354 according to an embodiment of the disclosure. As a non-limiting example, the joint assembly 354 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly. A second end 356 of the second drive shaft 350 is drivingly connected to a second joint assembly 356 according to an embodiment of the disclosure. As a non-limiting example, the second joint assembly 358 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Drivingly connected to an end of the second joint assembly 358 is an end of a rear axle system input shaft 360. As a non-limiting example, the rear axle system input shaft 360 is a rear axle differential input shaft, a coupling shaft, stub shaft or a rear axle differential pinion shaft. Drivingly connected to an end of the rear axle system input shaft 360 opposite the second drive shaft 350 is a rear axle differential 362. The rear axle differential 362 is a set of gears that allows the outer drive wheel(s) of the wheeled vehicle 300 to rotate at a faster rate that the inner drive wheel(s). The rotational power is transmitted through the rear axle system 314 as described in more detail below.

The rear axle system 314 further includes a first rear axle half shaft 364 and a second rear axle half shaft 366. The first rear axle half shaft 364 extends substantially perpendicular to the rear axle system input shaft 360. A first end 368 of the first rear axle half shaft 364 is drivingly connected to a first rear axle wheel assembly 370 and a second end 372 of the first rear axle half shaft 364 is drivingly connected to an end of the rear axle differential 362. As a non-limiting example, the second end 372 of the first rear axle half shaft 364 is drivingly connected to a rear axle differential side gear, a separate stub shaft, a separate coupling shaft, a first rear axle differential output shaft and/or a shaft that is formed as part of a rear axle differential side gear.

The second rear axle half shaft 366 extends substantially perpendicular to the rear axle system input shaft 360. A first end 374 of the second rear axle half shaft 366 is drivingly connected to a second rear axle wheel assembly 376 and a second end 378 of the second rear axle half shaft 366 is drivingly connected to an end of the rear axle differential 362 opposite the first rear axle half shaft 364. As a non-limiting example, the second end 378 of the second rear axle half shaft 366 is drivingly connected to a rear axle differential side gear, a separate stub shaft, a separate coupling shaft, a second rear axle differential output shaft and/or a shaft that is formed as part of a rear axle differential side gear.

Figure 4:
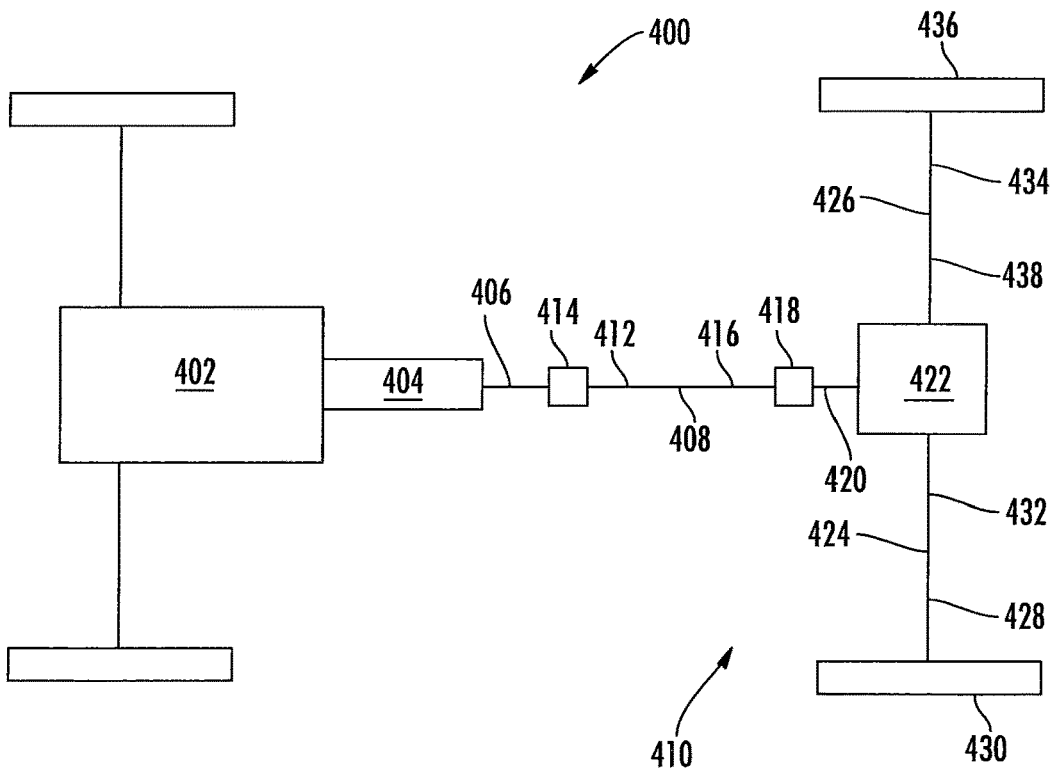
FIG. 4 is a schematic top-plan view of still another vehicle having one or more coupling assemblies according to an embodiment of the disclosure.

FIG. 4 is a schematic top-plan view of still another vehicle 400 having one or more coupling assemblies according to an embodiment of the disclosure. The vehicle 400 has an engine 402 which is drivingly connected to a transmission 404. A transmission output shaft 406 is then drivingly connected to an end of the transmission 404 opposite the engine 402. The transmission 404 is a power management system which provides controlled application of the rotational power generated by the engine 402 by means of a gear box.

A drive shaft 408 extends from the transmission output shaft 406 and drivingly connects the transmission 404 to a rear axle system 410. A first end 412 of the drive shaft 408 is drivingly connected to the end of the transmission output shaft 406 opposite the transmission 404 via a joint assembly 414 according to an embodiment of the disclosure. As a non-limiting example, the joint assembly 414 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly. A second end 416 of the drive shaft 408 is drivingly connected to a second joint assembly 418 according to an embodiment of the disclosure. As a non-limiting example, the second joint assembly 418 is a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Drivingly connected to an end of the second joint assembly 418 is an end of a rear axle input shaft 420. As a non-limiting example, the rear axle input shaft 420 is a differential input shaft, a coupling shaft, stub shaft or a differential pinion shaft. Drivingly connected to an end of the rear axle input shaft 420 opposite the drive shaft 408 is a rear axle differential 422. The rear axle differential 422 is a set of gears that allows the outer drive wheel(s) of the wheeled vehicle 400 to rotate at a faster rate that the inner drive wheel(s). The rotational power is transmitted through the rear axle system 410 as described in more detail below.

The rear axle system 410 further includes a first rear axle half shaft 424 and a second rear axle half shaft 426. The first rear axle half shaft 426 extends substantially perpendicular to the rear axle input shaft 420. A first end 428 of the first rear axle half shaft 424 is drivingly connected to a first rear axle wheel assembly 430 and a second end 432 of the first rear axle half shaft 424 is drivingly connected to an end of the rear axle differential 422. As a non-limiting example, the second end 432 of the first rear axle half shaft 424 is drivingly connected to a differential side gear, a separate stub shaft, a separate coupling shaft, a first rear axle differential output shaft and/or a shaft that is formed as part of a differential side gear.

The second rear axle half shaft 426 extends substantially perpendicular to the rear axle system input shaft 420. A first end 434 of the second rear axle half shaft 426 is drivingly connected to a second rear axle wheel assembly 436 and a second end 438 of the second rear axle half shaft 426 is drivingly connected to an end of the rear axle differential 422 opposite the first rear axle half shaft 424. As In a non-limiting example, the second end 438 of the second rear axle half shaft 426 is drivingly connected to a differential side gear, a separate stub shaft, a separate coupling shaft, a second rear axle differential output shaft and/or a shaft that is formed as part of a differential side gear.

Figure 5B:
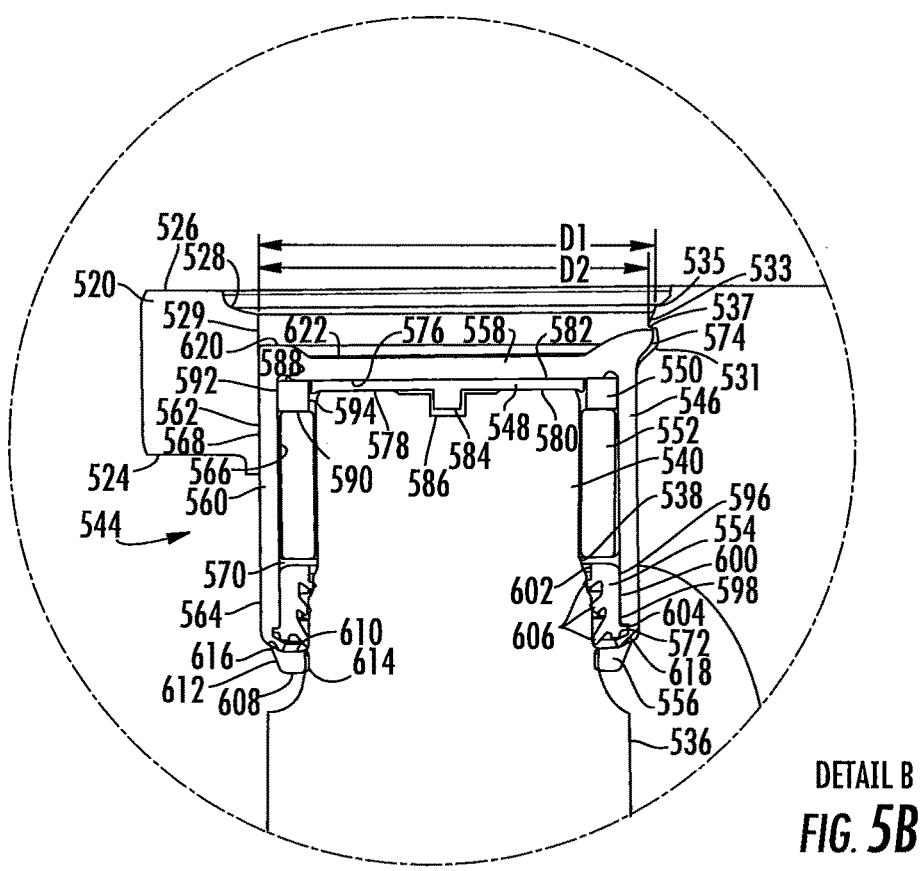
FIG. 5B is a schematic cross-sectional detailed-view of a portion of the joint assembly according to the embodiment illustrated in FIGS. 5 and 5A of the disclosure.
Figure 5C:
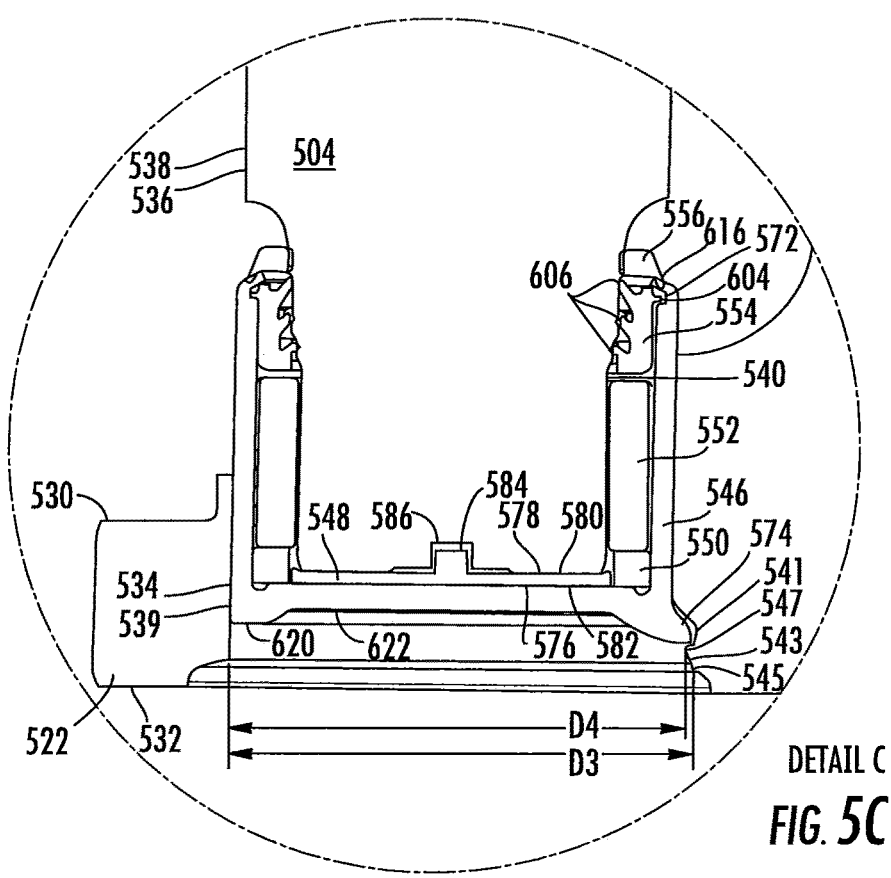
FIG. 5C is a schematic cross-sectional detailed-view of a portion of the joint assembly according to the embodiment illustrated in FIGS. 5-5B of the disclosure.
Figure 5D:
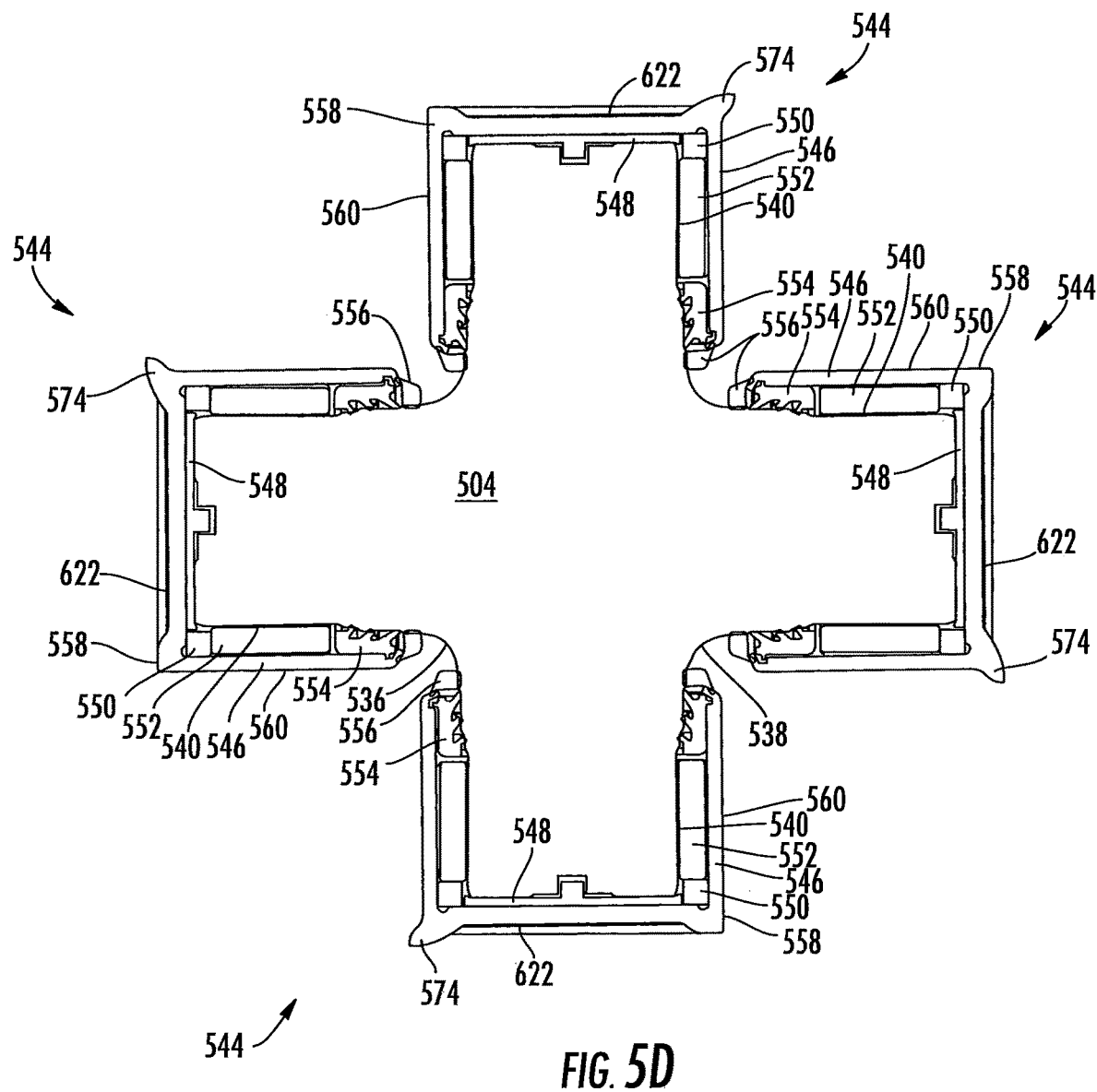
FIG. 5D is a schematic cut-away front-view of a portion of the joint assembly according to the embodiment illustrated in FIGS. 5-5C of the disclosure.
Figure 5F:
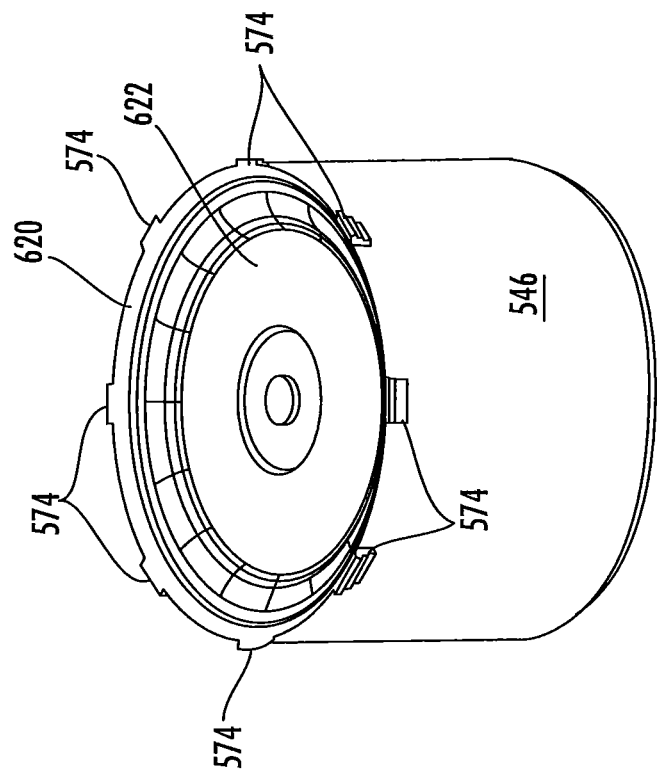
FIG. 5F is a perspective view of the bearing cup illustrated in FIG. 5E of the disclosure.
Figure 5E:
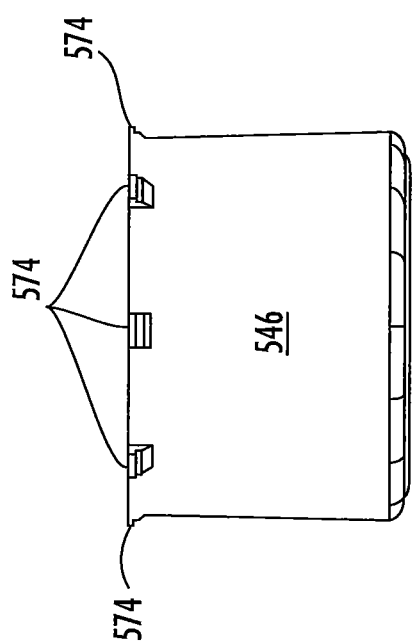
FIG. 5E is a schematic side-view of a bearing cup according to the embodiment illustrated in FIGS. 5-5D of the disclosure.

FIGS. 5-5F provide a schematic illustration of a portion of a joint assembly 500 according to an embodiment of the disclosure. It is within the scope of this disclosure and as a non-limiting example that the joint assembly 500 may be any joint assembly known in the art that will drivingly and rotatively connect two rotating shafts where the joint assembly 500 incorporates the use of a bearing cup. As a result, it is within the scope of this disclosure and as a non-limiting example, the joint assembly 500 may be a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly. According to the embodiment of the disclosure illustrated in FIGS. 5-5F and as a non-limiting example, the joint assembly 500 is a universal joint assembly. It is to be understood that the joint assembly 500 illustrated in FIGS. 5-5F of the disclosure may be used as one or more of the one or more coupling assemblies 26, 30, 60, 64, 90, 98, 216, 220, 248, 256, 324, 328, 354, 358, 414 and 418 illustrated in FIGS. 1-4 of the disclosure previously discussed.

As best seen in FIGS. 5 and 5A of the disclosure and as a non-limiting example, the joint assembly 500 includes a first joint member 502 that is drivingly connected to a second joint member (not shown) via a third joint member 504. It is within the scope of this disclosure and as a non-limiting example that the first joint member 502 may be an end yoke or a slip yoke and the second joint member (not shown) may be an end yoke or a slip yoke. Additionally, it is within the scope of this disclosure and as a non-limiting example that the third joint member 504 of the joint assembly 500 may be a journal cross.

The first joint member 502 of the joint assembly 500 has a first end portion 506, a second end portion 510 and an intermediate portion 508 interposed between the first end second end portions 506 and 510 of the first joint member 502. At least a portion of the second end portion 510 of the first joint member 502 of the joint assembly 500 is integrally connected to at least a portion of a first end portion 513 of a first shaft 511. According to an embodiment of the disclosure and as a non-limiting example, at least a portion of the first end portion 513 of the first shaft 511 may be integrally formed as part of the second end portion 510 of the first joint member 502 of the joint assembly 500. In accordance with an alternative embodiment of the disclosure and as a non-limiting example, at least a portion of the first end portion 513 of the first shaft 511 may be integrally connected to at least a portion of the second end portion 510 of the first joint member 502 by using one or more mechanical fasteners, one or more welds, one or more adhesives, one or more snap-rings, a splined connection and/or a threaded connection. It is within the scope of this disclosure and as a non-limiting example that the first shaft 511 of the joint assembly 500 may be a drive shaft, a coupling shaft, a cardan shaft, a double Cardan shaft or a propeller shaft.

As best seen in FIG. 5A of the disclosure and as a non-limiting example, at least a portion of the second end portion 510 of the first joint member 502 of the joint assembly 500 includes a reduced diameter portion 512. The reduced diameter portion 512 of the second end portion 510 of the first joint member 502 of the joint assembly 500 provides a surface for connecting at least a portion of the first end portion 513 of the first shaft 511 to at least a portion of the second end portion 510 of the first joint member 502. In accordance with the embodiment of the disclosure illustrated in FIG. 5A and as a non-limited example, at least a portion of the reduced diameter portion 512 of the second end portion 510 of the first joint member 502 is received and/or retained within at least a portion a hollow portion 515 within the first end portion 513 of the first shaft 511 of the joint assembly 500. It is therefore to be understood that the reduced diameter portion 512 of the second end portion 510 of the first joint member 502 has a size and shape that is complementary to an inner surface 517 defining the hollow interior portion 515 of the first end portion 513 of the first shaft 511 of the joint assembly 500.

In accordance with the embodiment of the disclosure illustrated in FIG. 5A and as a non-limiting example, the reduced diameter portion 512 of the second end portion 510 of the first joint member 502 may include a hollow interior portion 518 that is defined by an inner surface 514. The hollow interior portion 518 of the second end portion 510 of the first joint member 502 extends inboard from at least a portion of the first end portion 510 of the first joint member 502 toward the intermediate portion 508 of the first joint member 502. The hollow interior portion 518 of the second end portion 510 of the first joint member 502 aids in reducing the overall weight, costs and material associated with the joint assembly 500.

Extending axially outboard from at least a portion of the intermediate portion 508 of the first joint member 502 of the joint assembly 500 is a first yoke arm 520 and a second yoke arm 522. As best seen in FIG. 5A of the disclosure and as a non-limiting example, the first yoke arm 520 of the first joint member 502 has an inboard side 524 and an outboard side 526. A first yoke arm aperture 528 extends from the inboard side 524 to the outboard side 526 of the first yoke arm 520 of the first joint member 502.

Circumferentially extending along at least a portion of a first yoke arm aperture surface 529 of the first yoke arm 520 defining the first yoke arm aperture 528 is one or more first yoke arm attachment grooves 531. It is within the scope of this disclosure and as a non-limiting example that the one or more first yoke arm attachment grooves 531 in the first yoke arm aperture surface 529 defining the first yoke arm aperture 528 may be cast as part of the first yoke arm 520 or machined into the first yoke arm aperture surface 529 defining the first yoke arm aperture 528 in the first yoke arm 520.

Disposed radially outboard from at least a portion of the one or more first yoke arm attachment grooves 531 in the first yoke arm aperture surface 529 defining the first yoke arm aperture 528 in the first yoke arm 520 is one or more first yoke arm lead-in portions 533. Additionally, the one or more one or more first yoke arm lead-in portions 533 of the first yoke arm aperture 528 circumferentially extend along at least a portion of the first yoke arm aperture surface 529 defining the first yoke arm aperture 528. As best seen in FIG. 5B of the disclosure and as a non-limiting example, the one or more first yoke arm lead-in portions 533 of the first yoke arm aperture 528 have a first end 535 and a second end 537. The first end 535 of the one or more first yoke arm lead-in portions 533 of the first yoke arm aperture 528 has a diameter D1 and the second end 537 of the one or more first yoke arm lead-in portions 533 has a diameter D2. As best seen in FIG. 5B of the disclosure and as a non-limiting example, the diameter D1 of the first end 535 of the one or more first yoke arm lead-in portions 533 is larger than the diameter D2 of the second end 537 of the one or more first yoke arm lead-in portions 533. It is within the scope of this disclosure and as a non-limiting example that the one or more first yoke arm lead-in portions 533 may be cast as part of the first yoke arm 520 or machined into the first yoke arm aperture surface 529 defining the first yoke arm aperture 528 in the first yoke arm 520.

The second yoke arm 522 extends axially outboard from at least a portion of the intermediate portion 508 of the first joint member 502 of the joint assembly 500. As illustrated in FIGS. 5 and 5A of the disclosure and as a non-limiting example, the second yoke arm 522 has an inboard side 530 and an outboard side 532. Extending from the inboard side 530 to the outboard side 532 of the second yoke arm 502 of the joint assembly 500 is a second yoke arm aperture 534. The first yoke arm aperture 528 in the first yoke arm 520 is aligned with the second yoke arm aperture 534 of the second yoke arm 522 of the first joint member 502 of the joint assembly 500.

Circumferentially extending along at least a portion of a second yoke arm aperture surface 539 of the second yoke arm 522 defining the second yoke arm aperture 534 is one or more second yoke arm attachment grooves 541. It is within the scope of this disclosure and as a non-limiting example that the one or more second yoke arm attachment grooves 541 in the second yoke arm aperture surface 539 defining the second yoke arm aperture 534 may be cast as part of the second yoke arm 522 or machined into the second yoke arm aperture surface 539 defining the second yoke arm aperture 534 in the second yoke arm 522.

Disposed radially outboard from at least a portion of the one or more first yoke arm attachment grooves 531 in the second yoke arm aperture surface 539 defining the second yoke arm aperture 534 in the second yoke arm 522 is one or more second yoke arm lead-in portions 543. Additionally, the one or more one or more second yoke arm lead-in portions 543 of the second yoke arm aperture 534 circumferentially extend along at least a portion of the second yoke arm aperture surface 539 defining the second yoke arm aperture 534. As best seen in FIG. 5C of the disclosure and as a non-limiting example, the one or more second yoke arm lead-in portions 543 of the second yoke arm aperture 534 have a first end 545 and a second end 547. The first end 545 of the one or more second yoke arm lead-in portions 543 of the second yoke arm aperture 534 has a diameter D3 and the second end 547 of the one or more second yoke arm lead-in portions 543 has a diameter D4. As best seen in FIG. 5C of the disclosure and as a non-limiting example, the diameter D3 of the first end 545 of the one or more second yoke arm lead-in portions 543 is larger than the diameter D4 of the second end 547 of the one or more second yoke arm lead-in portions 543. It is within the scope of this disclosure and as a non-limiting example that the one or more second yoke arm lead-in portions 543 may be cast as part of the second yoke arm 522 or machined into the second yoke arm aperture surface 539 defining the second yoke arm aperture 534 in the second yoke arm 522.

As best seen in FIGS. 5 and 5D of the disclosure and as a non-limiting example, the third joint member 504 of the joint assembly 500 includes a body portion 536 having an outer surface 538. Extending outboard from at least a portion of the outer surface 538 of the body portion 536 of the third joint member 504 is one or more trunnions 540. In accordance with the embodiment of the disclosure illustrated in FIGS. 5 and 5D and as a non-limiting example, the one or more trunnions 540 of the third joint member 504 are disposed equidistant along the outer surface 538 of the body portion 536 of the third joint member 504 along a single plane. The one or more trunnions 540 of the third joint member 504 are of a size and shape to be received and/or retained within at least a portion of the first yoke arm aperture 528 in the first yoke arm 520 and the second yoke arm aperture 534 in the second yoke arm 522 of the first joint member 502. As a result, it is within the scope of this disclosure and as a non-limiting example that at least a portion of one of the one or more trunnions 540 of the third joint member 504 are received and/or retained within at least a portion of the first yoke arm aperture 528 and at least a portion of one of the one or more trunnions 540 are received and/or retained within at least a portion of the second yoke arm aperture 534.

Rotatively connected to at least a portion of the outer surface 538 of the one or more trunnions 540 of the third joint member 504 of the joint assembly 500 is one or more bearing cup assemblies 544. As illustrated in FIGS. 5-5B and 5D of the disclosure and as a non-limiting example, at least a portion of one of the one or more bearing cup assemblies 544 are received and/or retained within at least a portion of the first yoke arm aperture 528 in the first yoke arm 520. Additionally, as illustrated in FIGS. 5-5B and 5D of the disclosure and as a non-limiting example, at least a portion of one of the one or more bearing cup assemblies 544 are received and/or retained within at least a portion of the second yoke arm aperture 534 in the second yoke arm 522 of the first joint member 502. The one or more bearing cup assemblies 544, aid in reducing the overall amount of friction between the first joint member 502 and the third joint member 504 when the joint assembly 500 is in operation. This aids in improving the overall life and durability of the joint assembly 500.

In accordance with the embodiment of the disclosure illustrated in FIGS. 5A, 5B and 5D and as a non-limiting example, one or more bearing cup assemblies 544 of the joint assembly 500 includes a bearing cup 546, one or more thrust members 548, a spacer 550, one or more bearings 552, one or more sealing members 554 and/or a slinger 556. As best seen in FIGS. 5A, 5B and 5D of the disclosure and as a non-limiting example, the bearing cup 546 of the one or more bearing cup assemblies 544 of the joint assembly 500 has a base portion 558 and a tubular portion 560. The tubular portion 560 of the bearing cup 546 extends radially inboard from at least a portion of the base portion 558 of the bearing cup 546 toward the body portion 536 of the third joint member 504. It is within the scope of this disclosure and as a non-limiting example that the tubular portion 560 of the bearing cup 546 may be integrally formed as part of or machined into the base portion 558 of the bearing cup 546. Additionally, it is within the scope of this disclosure and as a non-limiting example that the bearing cup 546 may be made of 1051J steel.

The tubular portion 560 of the bearing cup 546 of the one or more bearing cup assemblies 544 has a first end portion 562, a second end portion 564, an inner surface 566 and an outer surface 568. The inner surface 566 and the outer surface 568 of the bearing cup 546 defines a hollow portion 570 therein. As best seen in FIG. 5B of the disclosure and as a non-limiting example, at least a portion of the bearing cup 546 of the one or more bearing cup assemblies 544 is interposed between the outer surface 538 of the one or more trunnions 540 of the third joint member 504 and the first yoke arm aperture surface 529 defining the first yoke arm aperture 528. It is within the scope of this disclosure and as a non-limiting example that the tubular portion 560 of the bearing cup 546 of the one or more bearing cup assemblies 544 may be substantially cylindrical in shape.

According to the embodiment of the disclosure illustrated in FIG. 5B and as a non-limiting example, the tubular portion 560 of the bearing cup 546 may include the use of a sealing member groove 572. The sealing member groove 572 in the tubular portion 560 of the bearing cup 546 circumferentially extends along at least a portion of the second end portion 564 of the inner surface 566 of the bearing cup 546 of the one or more bearing cup assemblies 544. The sealing member groove 572 in the tubular portion 560 of the bearing cup 546 is of a size and shape to receive and/or retain at least a portion of the one or more sealing members 554 of the one or more bearing cup assemblies 544 of the joint assembly 500. It is to be understood that the sealing member groove 572 in the tubular portion 560 of the bearing cup 546 aids in ensuring that the one or more sealing members 554 are sealingly engaged with at least a portion of the inner surface 566 of the tubular portion 560 of the bearing cup 546. Additionally, it is to be understood that the sealing member groove 572 aids in ensuring that the one or more sealing members 554 are retained in their ideal operating position when the joint assembly 500 is in operation. As a result, the sealing member groove 572 in the tubular portion 560 of the bearing cup 546 aids in improving the overall life and durability of the joint assembly 500.

Circumferentially extending axially outboard from at least a portion of the outer surface 568 of the base portion 558 of the bearing cup 546 is one or more attachment portions 574. As best seen in FIG. 5B of the disclosure and as a non-limiting example, the one or more attachment portions 574 of the bearing cup 546 are of a size and shape to be received and/or retained within at least a portion of the one or more first yoke arm attachment grooves 531 in the first yoke arm aperture surface 529 defining the first yoke arm aperture 528. Additionally, as best seen in FIG. 5C of the disclosure and as a non-limiting example, the one or more attachment portions 574 of the bearing cup 546 are of a size and shape to be received and/or retained within at least a portion of the one or more second yoke arm attachment grooves 541 in the second yoke arm aperture surface 539 defining the second yoke arm aperture 534. It is within the scope of this disclosure and as a non-limiting example that the one or more attachment portions 574 of the bearing cup 546 may be cast as part of the bearing cup 546, machined into the outer surface 568 base portion 558 of the bearing cup 546 and/or cold forged into the outer surface 568 base portion 558 of the bearing cup 546.

Interposed between an inboard surface 576 of the base portion 558 of the bearing cup 546 and an end 578 of the one or more trunnions 540 of the third joint member 504 is the one or more thrust members 548 having an inner surface 580 and an outer surface 582. The one or more thrust members 548 of the one or more bearing cup assemblies 544 of the joint assembly 500 aids in reducing the overall amount of friction between the one or more trunnions 540 of the third joint member 504 and the bearing cup 546 of the one or more bearing cup assemblies 544. Additionally, the one or more thrust members 548 aid in supporting an amount of the axial loads experienced by the one or more bearing cup assemblies 544 when in operation. This aids in improving the overall life and durability of the joint assembly 500. It is within the scope of this disclosure and as a non-limiting example that the one or more thrust members 548 of the one or more bearing cup assemblies 544 may be one or more thrust washers and/or one or more thrust bearings. Additionally, it is within the scope of this disclosure and as a non-limiting example that the one or more thrust members 548 may be substantially disc-shaped.

According to the embodiment of the disclosure illustrated in FIGS. 5B and 5C and as a non-limiting example, the one or more thrust members 548 may further include a protruding portion 584. As best seen in FIGS. 5B and 5C and as a non-limiting example, the protruding portions 584 of the one or more thrust members 548 extend radially inboard from at least a portion of the inner surface 580 of the one or more thrust members 548. At least a portion of the protruding portion 584 of the one or more thrust members 548 are received and/or retained within at least a portion of a recessed portion 586 extending inboard from the end 578 of the one or more trunnions 540 of the third joint member 504. The protruding portion 584 and the recessed portion 586 are used in order to ensure that the one or more thrust members 548 of the one or more bearing cup assemblies 544 are assembled with the proper orientation and in their predetermined optimal operating position.

In accordance with an embodiment of the disclosure (not shown) and as a non-limiting example, the recessed portion 586 in the one or more trunnions 540 may be in fluid communication with a lubrication fluid conduit (not shown) that provides an amount of lubrication fluid (not shown) to the one or more bearing cup assemblies 544. According to this embodiment of the disclosure and as a non-limiting example, the end of the lubrication fluid conduit (not shown), opposite the recessed portion 586 of the one or more trunnions 540, is in fluid communication with a lubrication fluid reservoir (not shown) that supplies an amount of lubrication fluid (not shown) to the one or more bearing cup assemblies 544.

Interposed between the inner surface 566 of the tubular portion 560 of the bearing cup 546 and the outer surface 538 of the one or more trunnions 540 is the one or more bearings 552 of the one or more bearing cup assemblies 544. Additionally, as best seen in FIGS. 5A-5D of the disclosure and as a non-limiting example, the one or more bearings 552 are interposed between at least a portion of the spacer 550 and the one or more sealing members 554 of the one or more bearing cup assemblies 544. The one or more bearings 552 allow for relative rotation between the one or more trunnions 540, the bearing cup 546, the first yoke arm 520 and/or the second yoke arm 522 of the joint assembly 500. It is within the scope of this disclosure and as a non-limiting example that the one or more bearings 552 may be one or more needle bearings, one or more journal bearings, one or more bushings, one or more magnetic bearings and/or one or more rolling element bearings. Additionally, it is within the scope of this disclosure and as a non-limiting example that the one or more bearings 552 of the one or more bearing cup assemblies 544 may be substantially cylindrical in shape.

As best seen in FIGS. 5A-5D of the disclosure and as a non-limiting example, the spacer 550 is disposed directly adjacent to and axially outboard from at least a portion of the one or more thrust members 548. Additionally, as best seen in FIGS. 5A-5D and as a non-limiting example; the spacer 550 is disposed directly adjacent to and radially outboard from an end of the one or more bearings 552 opposite the one or more sealing members 554 of the one or more bearing cup assemblies 544. The spacer 550 has a top portion 588, bottom portion 590, an outboard side 592 and an inboard side 594. At least a portion of the top portion 588 of the spacer 550 is in direct contact with and adjacent to the inboard surface 576 of the base portion 558 of the bearing cup 546. Additionally, at least a portion of the outboard surface 592 of the spacer 550 is in direct contact with and adjacent to the inner surface 566 of the tubular portion 560 of the bearing cup 546. It is to be understood that the spacer 550 is used to position the one or more bearings 552 and/or the thrust washer 548 within the one or more bearing cup assemblies 544 and to ensure that the one or more bearings 552 and/or the thrust washer 548 remain in their ideal operating position when the joint assembly 500 is in operation. It is within the scope of this disclosure and as a non-limiting example that the spacer 550 of the one or more bearing cup assemblies 544 may be substantially ring-shaped.

Disposed radially inboard from the spacer 550 and the one or more bearings 552 is the one or more sealing members 554 of the one or more bearing cup assemblies 544. As best seen in FIG. 5B of the disclosure and as a non-limiting example, the one or more sealing members 554 have a first end portion 596, a second end portion 598, an outboard surface 600 and an inboard surface 602. At least a portion of the inboard surface 602 of the one or more sealing members 554 are sealingly engaged with at least a portion of the outer surface 538 of the one or more trunnions 540 of the third joint member 504. Additionally, at least a portion of the outboard surface 600 of the one or more sealing members 554 is sealingly engaged with at least a portion of the inner surface 566 of the second end portion 564 of the tubular portion 560 of the bearing cup 546. The one or more sealing members 554 are used to prevent the lubrication fluids (not shown) from escaping the one or more bearing cup assemblies 544. Additionally, the one or more sealing members 554 are used in order to prevent the migration or dirt, debris and/or moisture into the one or more bearing cup assemblies 544 of the joint assembly 500. This aids in improving the overall life and durability of the one or more bearing cup assemblies 544.

Circumferentially extending outboard from at least a portion of the second end portion 598 of the outboard surface 600 of the one or more sealing members 554 of the one or more bearing cup assemblies 544 is an increased diameter portion 604. As best seen in FIGS. 5B and 5C of the disclosure and as a non-limiting example, at least a portion of the increased diameter portion 604 of the one or more sealing members 554 are received and/or retained within at least a portion of the sealing member groove 572 in the inner surface 566 of the second end portion 564 of the bearing cup 546. The increased diameter portion 604 of the one or more sealing members 554 are used to secure and retain the one or more sealing members 554 in a predetermined location within the hollow portion 570 of the bearing cup 546.

According to an embodiment of the disclosure and as a non-limiting example, the inboard surface 602 of the one or more sealing members 554 may further include the use of one or more sealing lips 606 that extend inboard from the inboard surface 602 of the one or more sealing members 554. The one or more sealing lips 606 are of a size and a shape that allow the sealing lips 606 to elastically deform when installed over the one or more trunnions 540 of the third joint member 504. This aids in ensuring that at least a portion of the inboard surface 602 of the one or more sealing members 554 maintains a sufficient seal with the outer surface 538 of the one or more trunnions 540 when the joint assembly 500 is in operation. Additionally, this aids in ensuring that the lubrication fluids (not shown) within the one or more bearing cup assemblies 544 do not escape from the one or more bearing cup assemblies 544. Furthermore, this aids in ensuring that the one or more sealing members 554 prevent the migration of dirt, debris and/or moisture into the one or more bearing cup assemblies 544 when the joint assembly 500 is in operation.

Disposed radially inboard from the spacer 550, the one or more bearings 552, the one or more sealing members 554 and the bearing cup 546 is the slinger 556 of the one or more bearing cup assemblies 544 of the joint assembly 500. As best seen in FIGS. 5A-5D of the disclosure and as a non-limiting example, the slinger 556 has a bottom portion 608, a top portion 610, an outboard surface 612 and an inboard surface 614. At least a portion of the top portion 610 of the slinger 556 is sealingly engaged with the at least a portion of the second end portion 564 of the tubular portion 560 of the bearing cup 546. Additionally, at least a portion of the inboard surface 614 of the slinger is sealingly engaged with at least a portion of the outer surface 538 of the one or more trunnions 540. The slinger 556 of the one or more bearing cup assemblies 544 aid in preventing large debris from contacting the one or more sealing members 554 thereby improving the overall life and durability of the one or more sealing members 554 and the one or more bearing cup assemblies 544.

In accordance with the embodiment of the disclosure illustrated in FIGS. 5A-5D and as a non-limiting example, the slinger 556 may further include the use of a protruding portion 616. As best seen in FIGS. 5B and 5C of the disclosure and as a non-limiting example, the protruding portion 616 circumferentially extends from at least a portion of the top portion 610 of the slinger 556 toward to the bearing cup 546 of the one or more bearing cup assemblies 544 of the joint assembly 500. At least a portion of an end of the protruding portion 616 is received and/or retained within at least a portion of a slinger groove 618 circumferentially extending along at least a portion of the outer surface 568 of the second end portion 564 of the tubular portion 560 of the bearing cup 546. The radially protruding portion 616 of the slinger 556 is used in order to ensure that the slinger 556 maintains a proper seal with the second end portion 564 of the tubular portion 560 of the bearing cup 546.

When the one or more bearing cup assemblies 544 are installed over the one or more trunnions 540 of the third joint member 504, at least a portion of the one or more bearing cup assemblies 544 are inserted within at least a portion of the first and second yoke arm apertures 528 and 534 in the first and second yoke arms 520 and 522 of the first joint member 502. Once the one or more attachment portions 574 of the bearing cup 546 come into direct contact with the one or more first yoke arm lead-in portions 533 and 543 of the first and second yoke arm apertures 528 and 534, the amount of pressure applied onto the bearing cup 546 causes the one or more attachment portions 574 to elastically deform axially inboard. This facilities the securing of the bearing cup 546 within at least a portion of the first and second yoke arm apertures 528 and 534 of the first and second yoke arms 520 and 522 of the first joint member 502. It is to be understood that the one or more first yoke arm lead-in portions 533 and 543 are designed to make it easier to elastically deform the one or more attachment portions 574 of the bearing cup 546 being installed over the one or more trunnions 540 and within the first and second yoke arm apertures 528 and 534.

During assembly, when the one or more attachment portions 574 of the bearing cup 546 move past the one or more first and second yoke arm lead-in portions 533 and 543, the one or more attachment portions 574 return to their original shape, or close to their original shape, within the one or more first and second yoke arm attachment grooves 531 and 541. As a result, it is to be understood that when the one or more attachment portions 574 of the bearing cup 546 have traveled past the one or more first and second yoke arm lead-in portions 533 and 543, the one or more attachment portions 574 translate axially outboard into the one or more first and second yoke arm attachment grooves 531 and 541. This locks the one or more bearing cup assemblies 544 in its desired position within the first and second yoke arm apertures 528 and 534 and along the outer surface 538 of the one or more trunnions 540 of the third joint member 504 without the use of any snap-rings thereby reducing the overall costs associated with the manufacture joint assembly 500. As a result, this aids in making the one or more bearing cup assemblies 544 quicker and easier to install within the joint assembly 500.

According to an embodiment of the disclosure and as a non-limiting example, an outboard surface 620 of the base portion 558 of the bearing cup 546 may further include a recessed portion 622. In accordance with this embodiment of the disclosure illustrated in FIGS. 5B-5D and 5F and as a non-limiting example, the recessed portion 622 aids in allowing the one or more attachment portions 574 of the bearing cup 546 to elastically deform when being inserted into the first and second yoke arm apertures 528 and 534 of the first and second yoke arms 520 and 522 and over the one or more trunnions 540 of the third joint member 504. This is achieved by reducing the overall amount of material needed to elastically deform when the one or more attachment portions 574 of the bearing cup 546 contact the one or more first and second yoke arm lead-in portions 533 and 543 of the first and second yoke arm apertures 528 and 534 of the first and second yoke arms 520 and 522. As a result, the recessed portion 622 of the bearing cup 546 further aids in reducing the overall costs associated with the manufacture joint assembly 500 and aids in making the one or more bearing cup assemblies 544 quicker and easier to install within the joint assembly 500.

FIGS. 6 and 6A of the disclosure provide a schematic illustration of a portion of a joint assembly 700 according to an alternative embodiment of the disclosure. The joint assembly 700 illustrated in FIGS. 6 and 6A is the same as the joint assembly 500 illustrated in FIGS. 5-5F, except where specifically noted below. It is within the scope of this disclosure and as a non-limiting example that the joint assembly 700 may be any joint assembly known in the art that will drivingly and rotatively connect two rotating shafts where the joint assembly 700 incorporates the use of a bearing cup. As a result, it is within the scope of this disclosure and as a non-limiting example, the joint assembly 700 may be a universal joint assembly, a U-joint assembly, a universal joint assembly, a cardan joint assembly, a double cardan joint assembly, a Hooke's joint assembly, a Spicer joint assembly, a homokinetic joint assembly, a constant velocity joint assembly or a Hardy Spicer joint assembly. According to the embodiment of the disclosure illustrated in FIGS. 6 and 6A and as a non-limiting example, the joint assembly 700 is a universal joint assembly. It is to be understood that the joint assembly 700 illustrated in FIGS. 6 and 6A of the disclosure may be used as one or more of the one or more coupling assemblies 26, 30, 60, 64, 90, 98, 216, 220, 248, 256, 324, 328, 354, 358, 414 and 418 illustrated in FIGS. 1-4 previously discussed.

As best seen in FIG. 6A of the disclosure and as a non-limiting example, the joint assembly 700 includes one or more bearing cup assemblies 702 having a bearing cup 546, one or more bearings 552, a slinger 556 and one or more sealing members 704. In accordance with the embodiment of the disclosure illustrated in FIGS. 6 and 6A and as a non-limiting example, the one or more bearing cup assemblies 702 does not include the use of the one or more thrust elements 548, the spacer 550 or the one or more sealing members 554 illustrated in FIGS. 5-5F of the disclosure.

Interposed between the one or more bearings 552 and the slinger 556 of the one or more bearing cup assemblies 702 is one or more sealing members 704 having an inboard surface 706 and an outboard surface 708. At least a portion of the inboard surface 706 of the one or more sealing members 704 are sealingly engaged with at least a portion of the outer surface 538 of the one or more trunnions 540 of the third joint member 502 of the joint assembly 700. Additionally, at least a portion of the outboard surface 708 of the one or more sealing members 704 are sealingly engaged with at least a portion of the inner surface 566 of the tubular portion 560 of the bearing cup 546 of the one or more bearing cup assemblies 702. It is to be understood that the one or more sealing members 704 aid in preventing the migration of dirt, debris and/or moisture into the one or more bearing cup assemblies 702 thereby aiding in improving the overall life and durability of the joint assembly 700. As a non-limiting example, the one or more sealing members 704 may be substantially ring-shaped.

According to the embodiment of the disclosure where the bearing cup 546 of the one or more bearing cup assemblies 702 includes the sealing member groove 572 in the inner surface 566 of the tubular portion 560 of the bearing cup 546, at least a portion of the outboard surface 708 of the one or more sealing members 704 are received and/or retained within at least a portion of the sealing member groove 572. As a result, in accordance with this embodiment of the disclosure, at least a portion of the outboard surface 708 of the one or more sealing members 704 are sealingly engaged with at least a portion of the sealing member groove 572 of the bearing cup 546. It is to be understood that the sealing member groove 572 in the tubular portion 560 of the bearing cup 546 aids in ensuring that the one or more sealing members 704 are sealingly engaged with at least a portion of the inner surface 566 of the tubular portion 560 of the bearing cup 546. Additionally, it is to be understood that the sealing member groove 572 aids in ensuring that the one or more sealing members 704 are retained in their ideal operating position when the joint assembly 700 is in operation. As a result, the sealing member groove 572 in the tubular portion 560 of the bearing cup 546 aids in improving the overall life and durability of the joint assembly 700.

It is to be understood that the slinger 556 of the one or more bearing cup assemblies 702 aid in preventing large debris from contacting the one or more sealing members 704 thereby improving the overall life and durability of the one or more sealing members 704. As a result, it is to be understood that the slinger 556 aids in improving the overall life and durability of the one or more bearing cup assemblies 702 of the joint assembly 700.

Figure 7A:
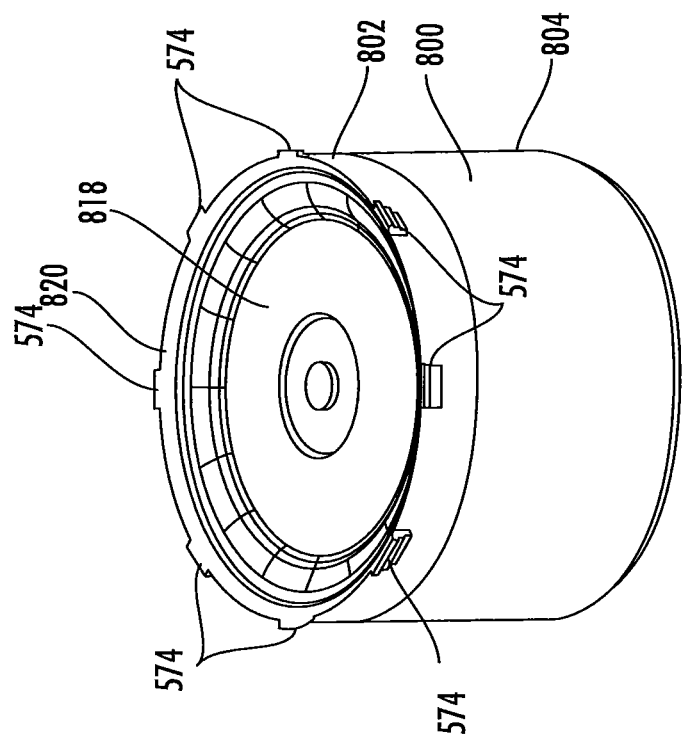
FIG. 7A is schematic perspective view of the bearing cup according to the embodiment illustrated in FIG. 7 of the disclosure.
Figure 7:
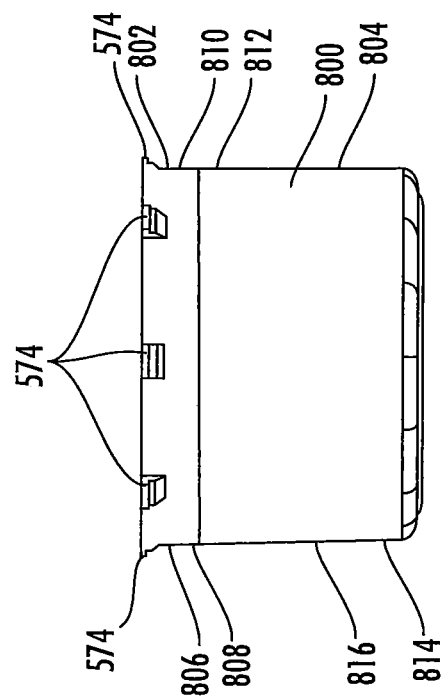
FIG. 7 is a schematic side-view of a bearing cup according to an embodiment of the disclosure.

FIGS. 7 and 7A provide a schematic illustration of a bearing cup 800 according to another embodiment of the disclosure. The bearing cup 800 illustrated in FIGS. 7 and 7A is the same as the bearing cup 546 illustrated in FIGS. 5-6A, except where specifically noted below. It is within the scope of this disclosure and as a non-limiting example, that the bearing cup 800 illustrated in FIGS. 7 and 7A may be used in place of the bearing cup 546 of the one or more bearing cup assemblies 544 and 702 illustrated in FIGS. 5-6A of the disclosure.

As illustrated in FIGS. 7 and 7A of the disclosure and as a non-limiting example, the bearing cup 800 includes a base portion 802 and a tubular portion 804. The base portion 802 of the bearing cup 800 has a first end portion 806, a second end portion 808 and an outer surface 810. Circumferentially extending from at least a portion of the outer surface 810 of the base portion 802 of the bearing cup 800 is the one or more attachment portions 574. It is within the scope of this disclosure and as a non-limiting example that the base portion 802 and/or the tubular portion 804 of the bearing cup 800 may be made of 1051J steel.

The tubular portion 804 of the bearing cup 800 has a first end portion 812, a second end portion 814 and an outer surface 816. In accordance with the embodiment of the disclosure illustrated in FIGS. 7 and 7A and as a non-limiting example, at least a portion of the first end portion 812 of the of the tubular portion 804 of the bearing cup 800 is integrally connected to at least a portion of the second end portion 808 of the base portion 802 of the bearing cup 800. It is within the scope of this disclosure and as anon-limiting example that the first end portion 812 of the tubular portion 804 of the bearing cup 800 may be integrally connected to the second end portion 808 of the base portion 802 of the bearing cup 800 by using one or more welds, one or more mechanical fasteners, one or more adhesives, one or more snap-rings and/or a threaded connection.

In accordance with the embodiment of the disclosure illustrated in FIG. 7A and as a non-limiting example, the base portion 802 of the bearing cup 800 may further include a recessed portion 818. The recessed portion 818 of the base portion 802 of the bearing cup 800 extends inboard from at least a portion of the outer surface 810 of an outboard surface 820 bearing cup 800. The recessed portion 818 aids in allowing the one or more attachment portions 574 of the bearing cup 800 to elastically deform when being inserted into the first and second yoke arm apertures 528 and 534 of the first and second yoke arms 520 and 522 and over the one or more trunnions 540 of the third joint member 504. This is achieved by reducing the overall amount of material needed to elastically deform when the one or more attachment portions 574 of the bearing cup 800 contact the one or more first and second yoke arm lead-in portions 533 and 543 of the first and second yoke arm apertures 528 and 534 of the first and second yoke arms 520 and 522. As a result, the recessed portion 818 of the bearing cup 800 further aids in reducing the overall costs associated with the manufacture joint assemblies 500 and 700 and aids in making the one or more bearing cup assemblies 800 quicker and easier to install within the joint assemblies 500 and 700.

Figure 8A:
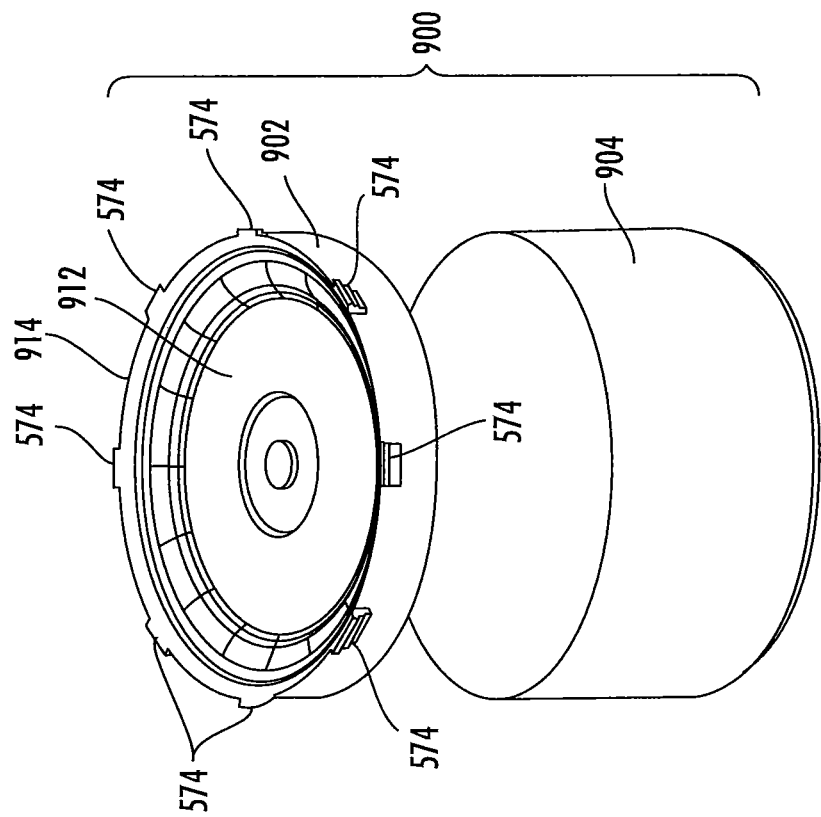
FIG. 8A is a schematic perspective view of the bearing cup assembly according to the embodiment illustrated in FIG. 8 of the disclosure.
Figure 8:
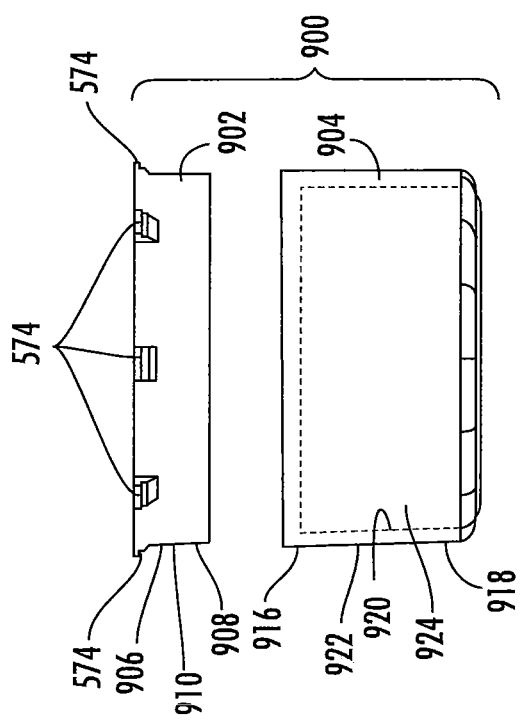
FIG. 8 is a schematic side-view of the bearing cup illustrated in FIGS. 7 and 7A according to an alternative embodiment of the disclosure.
Figure 8B:
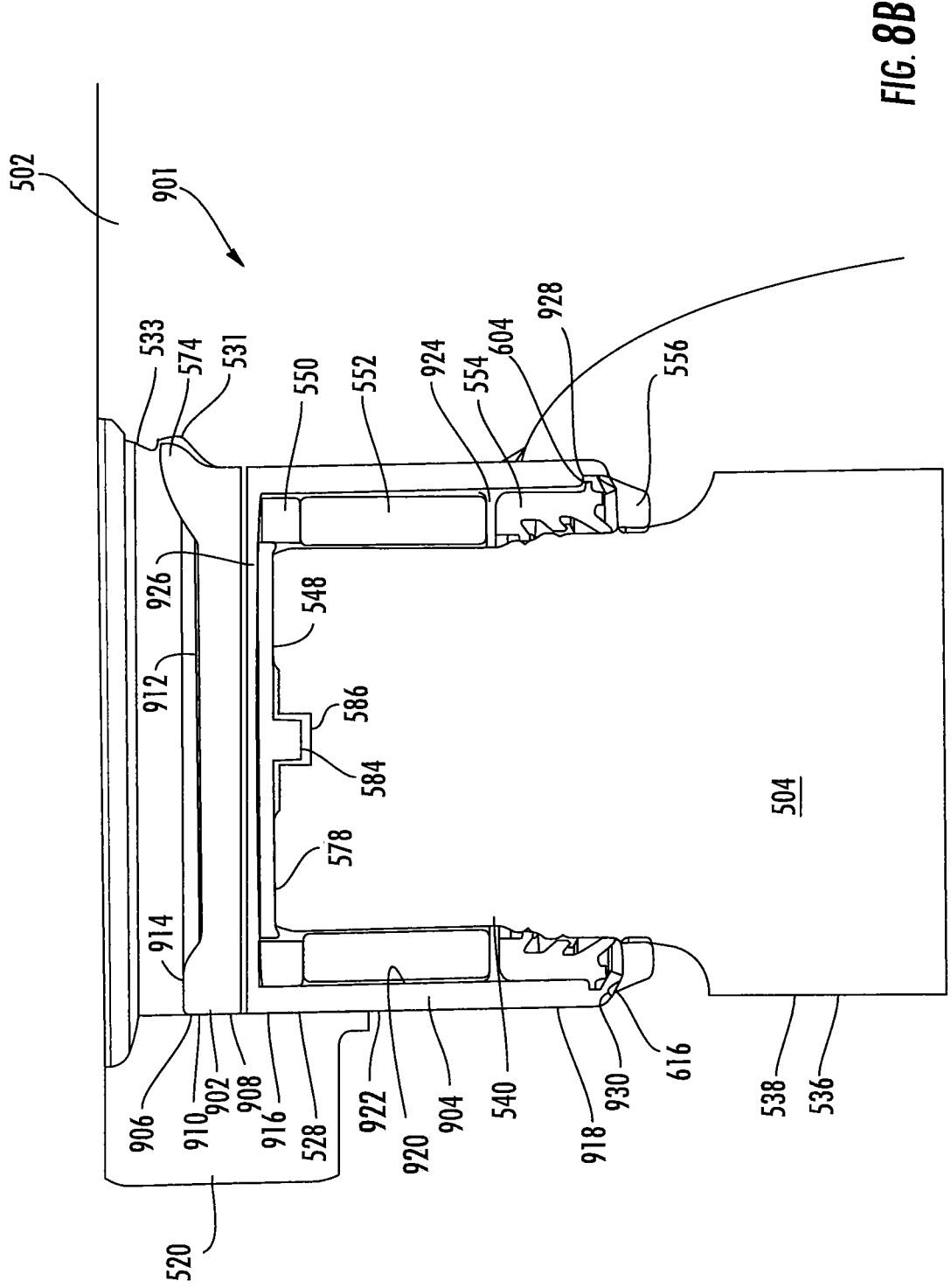
FIG. 8B is a cut-away schematic side view of a portion of the joint assembly illustrated in FIGS. 5-6A having the bearing cup according to the embodiment illustrated in FIGS. 8 and 8A of the disclosure.

FIGS. 8-8B provide a schematic illustration of a bearing cup 900 according to yet another embodiment of the disclosure. The bearing cup 900 illustrated in FIGS. 9-9B is the same as the bearing cups 546 and 800 illustrated in FIGS. 5-7A, except where specifically noted below. It is within the scope of this disclosure and as a non-limiting example, that the bearing cup 900 illustrated in FIGS. 8 and 8B may be used in place of the bearing cup 546 of the one or more bearing cup assemblies 544 and 702 illustrated in FIGS. 5-6A of the disclosure.

As illustrated in FIGS. 8 and 8B of the disclosure and as a non-limiting example, the bearing cup 900 of the one or more bearing cup assemblies 901 includes a base portion 902 and a tubular portion 904. The base portion 902 of the bearing cup 900 has a first end portion 906, a second end portion 908 and an outer surface 910. Circumferentially extending from at least a portion of the outer surface 910 of the base portion 902 of the bearing cup 900 is the one or more attachment portions 574. It is within the scope of this disclosure and as a non-limiting example that the base portion 902 and/or the tubular portion 904 of the bearing cup 900 may be made of 1051J steel.

In accordance with the embodiment of the disclosure illustrated in FIGS. 8A and 8B and as a non-limiting example, the base portion 902 of the bearing cup 900 may further include a recessed portion 912. The recessed portion 912 of the base portion 902 of the bearing cup 900 extends inboard from at least a portion of the outer surface 910 of an outboard surface 914 bearing cup 900. The recessed portion 912 aids in allowing the one or more attachment portions 574 of the bearing cup 900 to elastically deform when being inserted into the first and second yoke arm apertures 528 and 534 of the first and second yoke arms 520 and 522 and over the one or more trunnions 540 of the third joint member 504. This is achieved by reducing the overall amount of material needed to elastically deform when the one or more attachment portions 574 of the bearing cup 900 contact the one or more first and second yoke arm lead-in portions 533 and 543 of the first and second yoke arm apertures 528 and 534 of the first and second yoke arms 520 and 522. As a result, the recessed portion 912 of the bearing cup 900 further aids in reducing the overall costs associated with the manufacture joint assemblies 500 and 700 and aids in making the one or more bearing cup assemblies 900 quicker and easier to install within the joint assemblies 500 and 700.

The tubular portion 904 of the bearing cup 900 has a first end portion 916, a second end portion 918, an inner surface 920, an outer surface 922 and a wall portion 926. The inner surface 920 and the outer surface 922 of the tubular portion 904 of the bearing cup 904 defines a hollow portion 924 therein. Additionally, the wall portion 926 of the tubular portion 904 closes off at least a portion of the first end portion 916 of the hollow portion 924 of the tubular portion 904 of the bearing cup 900. As best seen in FIG. 8B of the disclosure and as a non-limiting example, at the hollow portion 924 of the tubular portion 904 of the bearing cup 900 is of a size and shape to receive and/or retain at least a portion of the one or more trunnions 540, the one or more thrust members 548, the spacer 550, one or more bearings 552 and/or the one or more sealing members 554. In accordance with the embodiment illustrated in FIG. 8B and as a non-limiting example, at least a portion of the one or more sealing members 554 are sealingly engaged with at least a portion of the outer surface 538 of the one or more trunnions 540 and the inner surface 920 of the tubular portion 904 of the bearing cup 900. It is therefore within the scope of this disclosure and as a non-limiting example, that the one or more sealing members 554 of the one or more bearing cup assemblies 901 aid in preventing the migration of dirt, debris and/or moisture into the one or more bearing cup assemblies 901.

As illustrated in FIG. 8B and as a non-limiting example, at least a portion of the spacer 550, one or more bearings 552 and/or the one or more sealing members 554 of the one or more bearing cup assemblies 901 are interposed between the inner surface 920 of the tubular portion 904 of the bearing cup 900 and the outer surface 538 of the one or more trunnions 540 of the third joint member 504. Additionally, according to the embodiment illustrated in FIG. 8B and as a non-limiting example, at least a portion of the one or more thrust members 548 of the one or more bearing cup assemblies 901 are interposed between the end 587 of the one or more trunnions 540 and the inner surface 920 of the wall portion 926 of the tubular portion 904 of the bearing cup 900.

According to the embodiment of the disclosure illustrated in FIG. 8B and as a non-limiting example, the tubular portion 904 of the bearing cup 900 may further include a sealing member groove 928. The sealing member groove 928 circumferentially extends along at least a portion of the inner surface 920 of the second end portion 918 of the tubular portion 904 of the bearing cup 900 of the one or more bearing cup assemblies 901. As best seen in FIG. 8B of the disclosure and as a non-limiting example, the sealing member groove 928 of the tubular portion 904 of the bearing cup 904 is of a size and shape to receive and/or retain at least a portion of the increased diameter portion 604 of the one or more sealing members 554.

The tubular portion 904 of the bearing cup assembly 900 may further include a slinger groove 930. As best seen in FIG. 8B of the disclosure and as a non-limiting example, the slinger groove 930 circumferentially extends along at least a portion of the outer surface 922 of the second end portion 918 of the tubular portion 904 of the bearing cup 900. It is to be understood that the slinger 556 of the one or more bearing cup assemblies 901 aid in preventing large debris from contacting the one or more sealing members 554 thereby improving the overall life and durability of the one or more sealing members 554 and the one or more bearing cup assemblies 901.

When assembled, at least a portion of the base portion 902 of the bearing cup 900 is disposed radially outboard from and is in direct contact with at least a portion of the tubular portion 904 of the bearing cup 900 of the one or more bearing cup assemblies 901. As illustrated in FIG. 8B and as a non-limiting example, when the one or more bearing cup assemblies 901 are assembled, at least a portion of the second end portion 908 of the base portion 902 is in direct contact with at least a portion of the outer surface 922 of the wall portion 926 of the tubular portion 904 of the bearing cup 904.

When the one or more bearing cup assemblies 901 are installed over the one or more trunnions 540 of the third joint member 504, at least a portion of the base portion 902 and the tubular portion 904 of the one or more bearing cup assemblies 901 are inserted within at least a portion of the first and second yoke arm apertures 528 and 534 in the first and second yoke arms 520 and 522. Once the one or more attachment portions 574 of the base portion 902 of the bearing cup 900 come into direct contact with the one or more first and second yoke arm lead-in portions 533 and 543 of the first and second yoke arm apertures 528 and 534, the amount of pressure applied onto the bearing cup 900 causes the one or more attachment portions 574 to elastically deform axially inboard. This facilities the securing of the bearing cup 900 within at least a portion of the first and second yoke arm apertures 528 and 534 of the first and second yoke arms 520 and 522 of the first joint member 502. It is to be understood that the one or more first and second yoke arm lead-in portions 533 and 543 are designed to make it easier to elastically deform the one or more attachment portions 574 of the base portion 902 of the bearing cup 900 being installed over the one or more trunnions 540 and within the first and second yoke arm apertures 528 and 534.

During assembly, when the one or more attachment portions 574 of the base portion 902 of the bearing cup 900 move past the one or more first and second yoke arm lead-in portions 533 and 543, the one or more attachment portions 574 return to their original shape, or close to their original shape, within the one or more first and second yoke arm attachment grooves 531 and 541. As a result, it is to be understood that when the one or more attachment portions 574 of the base portion 902 of the bearing cup 900 have traveled past the one or more first and second yoke arm lead-in portions 533 and 543, the one or more attachment portions 574 translate axially outboard into the one or more first and second yoke arm attachment grooves 531 and 541. This locks the tubular portion 904 of the one or more bearing cup assemblies 901 within the first and second yoke arm apertures 528 and 534 and along the one or more trunnions 540 of the third joint member 504 without the use of any snap-rings thereby reducing the overall costs associated with the manufacture joint assembly 500 or 700. As a result, this aids in making the one or more bearing cup assemblies 901 quicker and easier to install within the joint assembly 500 or 700.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A bearing cup, comprising:
a base portion and a tubular portion;
wherein said tubular portion of said bearing cup has a first end portion, a second end portion and an inner surface;
wherein a sealing member groove circumferentially extends along at least a portion of said inner surface of said second end portion of said tubular portion of said bearing cup;
wherein said base portion has one or more attachment portions extending outboard from at least a portion of an outer surface of said base portion;
wherein said base portion of said bearing cup is disposed outboard from at least a portion of said first end portion of said tubular portion of said bearing cup;
wherein said one or more attachment portions of said bearing cup are elastically deformable;
wherein an axially recessed portion extends inward from at least a portion of an outboard surface of said base portion of said bearing cup; and
wherein said recessed portion aids in facilitating said elastic deformation of said one or more attachment portions of said bearing cup.

2. The bearing cup of claim 1, wherein said base portion of said bearing cup is separate from said tubular portion of said bearing cup;
wherein said entire base portion of said bearing cup is disposed outboard from said tubular portion of said bearing cup;
wherein said tubular portion of said bearing cup has an inner surface and an outer surface defining a hollow portion therein and a wall portion that closes off at least a portion of a first end portion of said hollow portion of said tubular portion of said bearing cup; and
wherein at least a portion of a second end portion of said base portion is in direct contact with an outer surface of said wall portion of said tubular portion of said bearing cup.

3. A joint assembly, comprising:
a first joint member that is drivingly connected to a second joint member by a third joint member;
wherein said first joint member has a first yoke arm with a first yoke arm aperture defined by a first yoke arm aperture surface and a second yoke arm with a second yoke arm aperture defined by a second yoke arm aperture surface;
wherein one or more first yoke arm attachment grooves circumferentially extend along at least a portion of said first yoke arm aperture surface and one or more second yoke arm attachment grooves circumferentially extend along at least a portion of said second yoke arm aperture surface;
one or more bearing cup assemblies comprising a single-piece bearing cup having a tubular portion and a base portion disposed radially outboard from said tubular portion;
wherein at least a portion of said base portion of said bearing cup of said one or more bearing cup assemblies is integrally formed as part of at least a portion of said tubular portion of said bearing cup;
wherein at least a portion of said one or more bearing cup assemblies are received and/or retained within at least a portion of said first yoke arm aperture and said second yoke arm aperture of said first joint member;
wherein one or more attachment portions circumferentially extend outboard from at least a portion of an outer surface of said base portion of said bearing cup;
wherein said one or more attachment portions of said bearing cup are elastically deformed to be received and/or retained within at least a portion of said one or more first yoke arm attachment grooves and said one or more second yoke arm attachment grooves;
wherein a recessed portion extends inward from at least a portion of an outboard surface of said base portion of said bearing cup; and
wherein said recessed portion aids in facilitating said elastic deformation of said one or more attachment portions of said bearing cup.

4. The joint assembly of claim 3, wherein said first yoke arm aperture further comprises one or more first yoke arm lead-in portions circumferentially extending along at least a portion of said first yoke arm aperture surface defining said first yoke arm aperture;
wherein at least a portion of said one or more first yoke arm lead-in portions in said first yoke arm aperture are disposed outboard from at least a portion of said one or more first yoke arm attachment grooves in said first yoke arm aperture surface of said first yoke arm aperture; and
wherein said one or more first yoke arm lead-in portions of said first yoke arm aperture have a first end having a diameter D1 and a second end having a diameter D2 that is smaller than said diameter D1 of said first end portion of said one or more first yoke arm lead-in portions of said first yoke arm aperture.

5. The joint assembly of claim 4, wherein said one or more first yoke arm lead-in portions in said first yoke arm aperture elastically deform said one or more attachment portions of said bearing cup inboard; and
wherein said one or more attachment portions of said bearing cup translate outboard and into said one or more first yoke arm attachment grooves in said first yoke arm aperture once said one or more attachment portions have translated beyond said one or more first yoke arm lead-in portions of said first yoke arm aperture.

6. The joint assembly of claim 3, wherein said second yoke arm aperture further comprises one or more second yoke arm lead-in portions circumferentially extending along at least a portion of said second yoke arm aperture surface defining said second yoke arm aperture;
wherein at least a portion of said one or more second yoke arm lead-in portions in said second yoke arm aperture are disposed outboard from at least a portion of said one or more second yoke arm attachment grooves in said second yoke arm aperture surface of said second yoke arm aperture; and
wherein said one or more second yoke arm lead-in portions of said second yoke arm aperture have a first end having a diameter D3 and a second end having a diameter D4 that is smaller than said diameter D3 of said first end portion of said one or more second yoke arm lead-in portions of said second yoke arm aperture.

7. The joint assembly of claim 6, wherein said one or more second yoke arm lead-in portions in said second yoke arm aperture elastically deform said one or more attachment portions of said bearing cup inboard; and
wherein said one or more attachment portions of said bearing cup translate outboard and into said one or more second yoke arm attachment grooves in said second yoke arm aperture once said one or more attachment portions have translated beyond said one or more second yoke arm lead-in portions of said second yoke arm aperture.

8. The joint assembly of claim 3, wherein said one or more bearing cup assemblies further comprises one or more sealing members having a first end portion, a second end portion, an inboard surface and an outboard surface;

wherein one or more sealing lips circumferentially extend inboard from at least a portion of said inboard surface of said one or more sealing members;

wherein at least a portion of said one or more sealing lips are sealingly engaged with at least a portion of one of one or more trunnions of said third joint member;

wherein an increased diameter portion circumferentially extends outboard from at least a portion of said outboard surface of said one or more sealing members of said one or more bearing cup assemblies; and wherein at least a portion of said outboard surface and/or said increased diameter portion of said one or more sealing members are sealingly engaged with at least a portion of an inner surface of said tubular portion of said bearing cup.

9. The joint assembly of claim 8, wherein said tubular portion of said bearing cup further comprises a sealing member groove;

wherein said tubular portion of said bearing cup has a first end portion, a second end portion, an inner surface and an outer surface;

wherein said sealing member groove circumferentially extends along at least a portion of said inner surface of said second end portion of said tubular portion of said bearing cup; and wherein at least a portion of said increased diameter portion of said one or more sealing members is received and/or retained within at least a portion of said sealing member groove in said inner surface of said tubular portion of said bearing cup.

10. The joint assembly of claim 3, wherein said one or more bearing cup assemblies further comprises a slinger;

wherein said tubular portion of said bearing cup has a first end portion, a second end portion, an inner surface and an outer surface;

wherein said slinger includes a protruding portion circumferentially extending from at least a portion a top portion of said slinger toward said tubular portion of said bearing cup; and wherein at least a portion of said protruding portion of said slinger is received and/or retained within at least a portion of a slinger groove circumferentially extending along at least a portion of an outer surface of said second end portion of said tubular portion of said bearing cup.

11. The joint assembly of claim 3, wherein said joint assembly is a universal joint assembly.

12. The joint assembly of claim 3, wherein said third joint member is a journal cross.

13. The joint assembly of claim 3, wherein said first joint member is an end yoke.

14. A joint assembly, comprising:

a first joint member that is drivingly connected to a second joint member by a third joint member;

wherein said first joint member has a first yoke arm with a first yoke arm aperture defined by a first yoke arm aperture surface and a second yoke arm with a second yoke arm aperture defined by a second yoke arm aperture surface;

wherein one or more first yoke arm attachment grooves circumferentially extend along at least a portion of said first yoke arm aperture surface and one or more second yoke arm attachment grooves circumferentially extend along at least a portion of said second yoke arm aperture surface;

one or more bearing cup assemblies comprising a bearing cup having a tubular portion and a base portion disposed radially outboard from said tubular portion;

wherein at least a portion of said one or more bearing cup assemblies are received and/or retained within at least a portion of said first yoke arm aperture and said second yoke arm aperture of said first joint member;

wherein one or more attachment portions circumferentially extend outboard from at least a portion of an outer surface of said base portion of said bearing cup;

wherein said one or more attachment portions of said bearing cup are elastically deformed to be received and/or retained within at least a portion of said one or more first yoke arm attachment grooves and said one or more second yoke arm attachment grooves;

wherein a recessed portion extends inward from at least a portion of an outboard surface of said base portion of said bearing cup;

wherein said recessed portion aids in facilitating said elastic deformation of said one or more attachment portions of said bearing cup;

wherein said base portion of said bearing cup of said one or more bearing cup assemblies is separate from said tubular portion of said bearing cup;

wherein said entire base portion of said bearing cup is disposed outboard from said tubular portion of said bearing cup;

wherein said tubular portion of said bearing cup has an inner surface and an outer surface defining a hollow portion therein and a wall portion that closes off at least a portion of a first end portion of said hollow portion of said tubular portion of said bearing cup; and wherein at least a portion of a second end portion of said base portion is in direct contact with an outer surface of said wall portion of said tubular portion of said bearing cup.

15. The joint assembly of claim 14, wherein said tubular portion of said bearing cup has a generally constant inner diameter.

* * * * *